(12) United States Patent
Oh et al.

(10) Patent No.: US 11,354,035 B2
(45) Date of Patent: Jun. 7, 2022

(54) ELECTRONIC APPARATUS FOR DISPLAYING CONTENT AND CONTROL METHOD THEREOF

(71) Applicant: LG ELECTRONICS INC., Seoul (KR)

(72) Inventors: Euitaek Oh, Seoul (KR); Shinhui Ahn, Seoul (KR); Juhye Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 16/826,712

(22) Filed: Mar. 23, 2020

(65) Prior Publication Data

US 2021/0223952 A1 Jul. 22, 2021

(30) Foreign Application Priority Data

Jan. 20, 2020 (WO) ................ PCT/KR2020/000942

(51) Int. Cl.
*H04M 1/02* (2006.01)
*G06F 3/04886* (2022.01)
*H04M 1/72409* (2021.01)

(52) U.S. Cl.
CPC ...... *G06F 3/04886* (2013.01); *H04M 1/0235* (2013.01); *H04M 1/0268* (2013.01); *H04M 1/72409* (2021.01); *H04M 2201/38* (2013.01)

(58) Field of Classification Search
None
See application file for complete search history.

(56) References Cited

U.S. PATENT DOCUMENTS

| | | | | |
|---|---|---|---|---|
| 9,927,839 B2* | 3/2018 | Kummer | ............. | H04M 1/0235 |
| 2016/0349790 A1* | 12/2016 | Connor | ................... | G06F 1/163 |
| 2016/0378270 A1* | 12/2016 | Lee | ........................ | G06F 3/0481 |
| | | | | 715/788 |
| 2017/0364119 A1* | 12/2017 | Lee | ........................ | G06F 1/1652 |
| 2020/0267246 A1* | 8/2020 | Song | .................... | G06F 1/1624 |
| 2021/0072796 A1* | 3/2021 | Kim | ..................... | G06F 1/1647 |
| 2021/0103314 A1* | 4/2021 | Ko | ......................... | G06F 1/1656 |
| 2021/0191558 A1* | 6/2021 | Jung | .................... | G06F 1/1652 |
| 2021/0240294 A1* | 8/2021 | Ko | ........................ | G06F 3/0416 |

FOREIGN PATENT DOCUMENTS

| | | |
|---|---|---|
| JP | 5688330 B2 | 3/2015 |
| JP | 2015-102681 A | 6/2015 |
| KR | 10-2014-0068427 A | 6/2014 |
| KR | 10-2017-0000553 A | 1/2017 |
| KR | 10-2017-0048007 A | 5/2017 |

* cited by examiner

*Primary Examiner* — Quoc D Tran
(74) *Attorney, Agent, or Firm* — Birch, Stewart, Kolasch & Birch, LLP

(57) ABSTRACT

An electronic apparatus having a case including a first frame and a second frame configured to slide and extend with respect to the first frame; a flexible display wound over a first surface and a second surface of the case, wherein a first area of the flexible display on the first surface is increased or decreased in size based on a sliding movement of the second frame with respect to the first frame; and a controller configured to display content associated with an application in the first area, in response to an event, display notification information associated with the event in the first area, and in response to a first input to a second area of the flexible display on the second surface of the case, display at least a portion of content associated with the event in the first area.

20 Claims, 14 Drawing Sheets

ELECTRONIC APPARATUS FOR DISPLAYING CONTENT AND CONTROL METHOD THEREOF

CROSS-REFERENCE TO RELATED APPLICATION

Pursuant to 35 U.S.C. § 119, this application claims the benefit of earlier filing date and right of priority to PCT International Application No. PCT/KR2020/000942 filed on Jan. 20, 2020, the contents of which are all hereby incorporated by reference herein in its entirety.

BACKGROUND OF THE INVENTION

Field of the Invention

This disclosure relates to an electronic apparatus for displaying content associated with a notification in response to an event related to the notification and a control method thereof, and one particular implementation relates to an electronic apparatus for displaying, when an event related to a notification occurs, content associated with the notification on at least one of a first surface and a second surface of the electronic apparatus based on the input, and a control method thereof.

Discussion of the Related Art

Advances of network technologies and expansions of infrastructures have enabled an electronic device to perform various tasks. The electronic device, for example, a mobile terminal provides services for various content such as a multimedia viewing, in addition to communication services such as call service, text service, or the like.

Among such services provided by the electronic device, services providing content such as multimedia have attracted attention. For example, among the services provided by the electronic device, a use ratio of services providing various content with visual outputs (hereinafter, referred to as "visual content") is increasing.

In addition, when another separate content is provided simultaneously with the visual content on the display, the other content may interfere with the visual content. For example, when a message is received and displayed during playing of the multimedia, the displayed message may interfere with a viewing of the multimedia.

Further, the electronic device can provide various functions. When an event such as a message reception occurs, a notification indicating the occurrence of the event can be provided to a user. Accordingly, there is a desire for a method to more efficiently provide a notification in association with content provision.

SUMMARY OF THE INVENTION

An aspect provides an electronic apparatus that displays content associated with a notification on a first surface or a second surface of the electronic apparatus in response to an event related to the notification, thereby efficiently providing the content associated with the notification, and a control method of the electronic apparatus.

Technical goals of the present disclosure are not limited as mentioned above and, although not mentioned, may include goals that can be clearly understood by those skilled in the art to which the present disclosure pertains, from the following description.

According to an aspect, there is provided an electronic apparatus including a case including a first frame and a second frame configured to slide and extend with respect to the first frame, a flexible display wound over a first surface and a second surface of the case, wherein a first area of the flexible display on the first surface is increased or decreased in size based on a sliding movement of the second frame with respect to the first frame, and a controller configured to display content associated with an application in the first area, in response to an event, display notification information associated with the event in the first area, and in response to a first input to a second area of the flexible display on the second surface of the case, display at least a portion of content associated with the event in the first area.

According to another aspect, there is also provided a method of controlling an electronic apparatus having a case including a first frame and a second frame configured to slide and extend with respect to the first frame, and a flexible display wound over a first surface and a second surface of the case, wherein a first area of the flexible display on the first surface is increased or decreased in size based on a sliding movement of the second frame with respect to the first frame, the method comprising: displaying content associated with an application in the first area, in response to an event, display information associated with the event in the first area, and in response to a first input to a second area of the flexible display on the rear surface of the case, displaying at least a portion of content associated with the event in the first area.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION OF THE EMBODIMENTS

Figure 1:
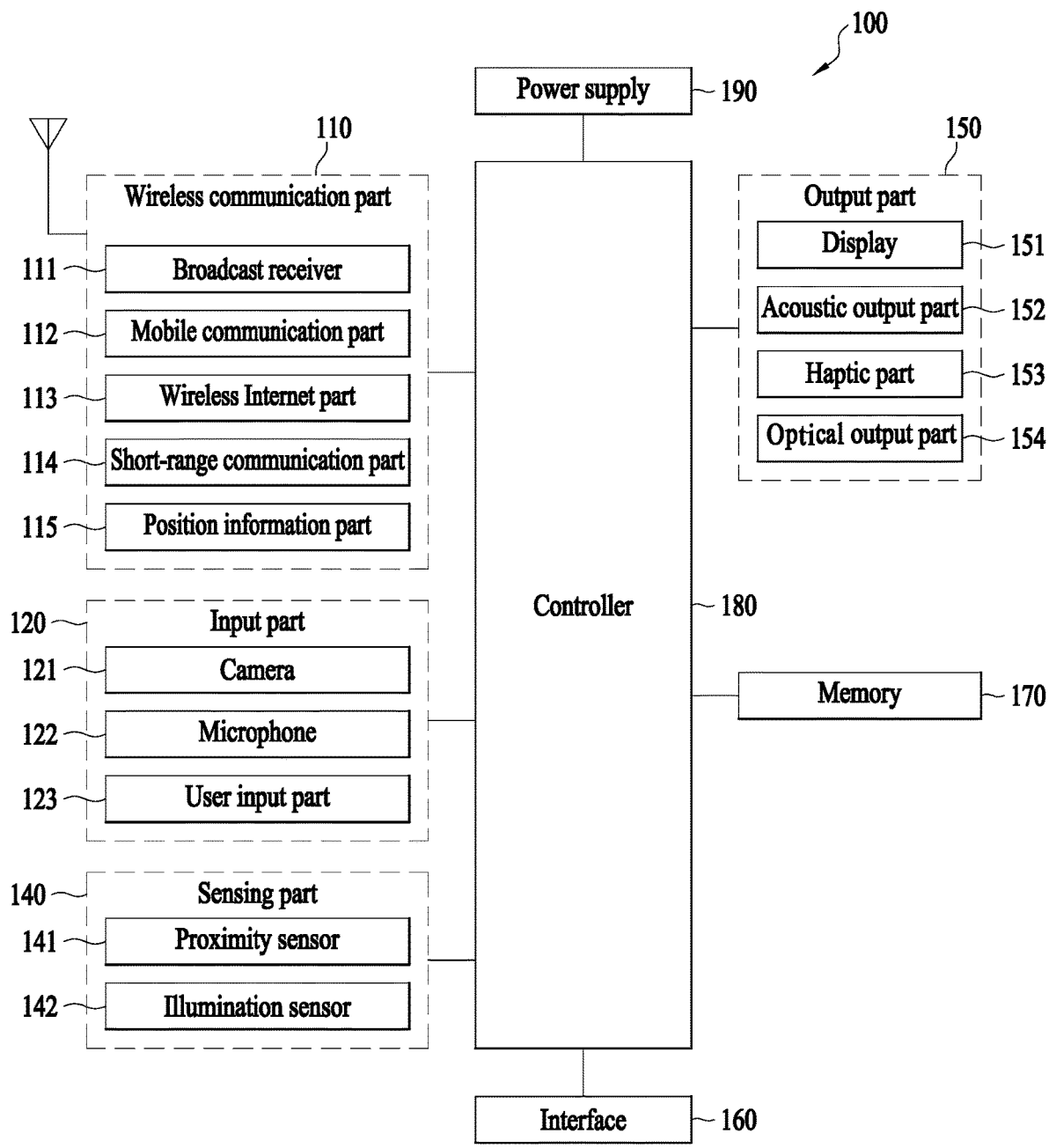
FIG. 1 is a block diagram illustrating an electronic apparatus related to the present disclosure.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. It should be understood, however, that there is no intent to limit this disclosure to the particular example embodiments disclosed. Further, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating an electronic apparatus (or a mobile terminal) 100 related to an example embodiment of the present disclosure. An electronic apparatus 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic apparatus, so the electronic apparatus 100 described herein may have more or fewer components than those listed above.

Specifically, the wireless communication part 110 may include at least one module that enables wireless communication to be performed between the electronic apparatus 100 and a wireless communication system, between the electronic apparatus 100 and another electronic apparatus 100, or between the electronic apparatus 100 and an external server. The wireless communication part 110 may include one or more modules that connect the electronic apparatus 100 to one or more networks.

The wireless communication part 110 may include at least one of a broadcast receiver 111, a mobile communication part 112, a wireless Internet part 113, a short-range communication part 114, and a position information part 115. Referring to the wireless communication part 110, the broadcast receiver 111 of the wireless communication part 110 may receive a broadcast signal and/or broadcast related information from an external broadcast management server through a broadcast channel. The broadcast channel may include a satellite channel and a terrestrial channel. Two or more broadcast receivers may be provided to the mobile terminal 100 for simultaneous broadcast reception or broadcast channel switching for at least two broadcast channels.

The mobile communication part 112 may transmit and receive a wireless signal to and from at least one of a base station, an external terminal, and a server on a mobile communication network constructed based on technical standards for mobile communication or communication schemes such as Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like, for example. The wireless signal may include various types of data based on transmission and reception of a voice call signal, a video call signal, or a text/multimedia message.

The wireless Internet part 113 may refer to a module for wireless Internet access, and may be embedded or disposed external to the electronic apparatus 100. The wireless Internet part 113 may be adapted to transmit or receive the wireless signal in the communication network based on wireless Internet technologies.

The wireless Internet technologies may be, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet part 113 may transmit and receive data based on at least one wireless Internet technology in a range including Internet technologies not listed above. In view of that the wireless Internet access made by WiBro, HSDPA, HSUPA, GSM, CDMA, WCDMA, LTE, and LTE-A is based on a mobile communication network, the wireless Internet part 113 that performs the wireless Internet access through the mobile communication network may be understood as a kind of the mobile communication part 112.

The short-range communication part 114 may be for short-range communication, and may support the short-range communication using at least one of Bluetooth™, Radio Frequency Identification (RFID), Infrared Data Association (IrDA), Ultra Wideband (UWB), ZigBee, NFC (Near Field Communication), Wi-Fi (Wireless-Fidelity), Wi-Fi Direct, Wireless Universal Serial Bus (USB) technology. The short-range communication part 114 may use wireless area networks to support wireless communication between the electronic apparatus 100 and a wireless communication system, wireless communication between the electronic apparatus 100 and another electronic apparatus 100, or wireless communication between the electronic apparatus 100 and a network in which another mobile terminal (100 or external server). The wireless range networks may be wireless personal area networks.

The position information part 115 may be a module that acquires a position (or current position) of a mobile terminal. A representative example of the position information part 115 may be a global positioning system (GPS) mobile or a Wi-Fi module. The mobile terminal can use the GPS module to acquire a position of the mobile terminal using signals transmitted from a GPS satellite. The mobile terminal can use the Wi-Fi module to acquire a position of the mobile terminal based on information on a wireless access point (AP) that transmits or receives a wireless signal to or from the Wi-Fi module. As necessary, the position information part 115 can perform a certain function of other modules of the wireless communication part 110 to acquire data on the position of the mobile terminal, additionally or in substitution. The position information part 115 may be a module used to acquire a position (or current position) of the mobile terminal and is not limited as a module that directly calculates or acquires a position of the mobile terminal.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 can be analyzed and processed as a control command of the user.

The camera 121 can process an image frame such as a stationary image or a moving image acquired by an image sensor in a video call mode or a capturing mode. The processed image frame can be displayed on the display 151 or stored in the memory 170. For example, the electronic apparatus 100 may include a plurality of cameras 121. In this example, the cameras 121 may be arranged in a matrix structure. Through the cameras 121 arranged in the matrix structure, a plurality of pieces of image information having various angles and focal points may be input to the electronic apparatus 100. Also, the plurality of cameras 121 may be arranged in a stereo structure to acquire left and right images for implementing a stereo image.

The microphone 122 can process an external acoustic signal into electrical voice data. The processed voice data can be variously used based on a function performed (or an application program executed) in the electronic apparatus 100. In the microphone 122, various noise removal algorithms can be implemented to remove noise generated in a process of receiving external acoustic signals.

The user input part 123 can receive information from a user. When the information is input through the user input part 123, the controller 180 can control an operation of the electronic apparatus 100 based on the input information. The user input part 123 may include a mechanical input means (or a mechanical key, for example, a button a dome switch, a jog wheel, and a jog switch on a front, rear, or side surface of the electronic apparatus 100) and a touch input means. The touch input means may include a virtual key, a soft key, or a visual key displayed on a touch screen through a software process, or include a touch key in a portion other than the touch screen. The virtual key or the visual key may each be displayed in a variety of forms and be any one or in a combination of, for example, graphics, texts, icons, and videos.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal can use a combination of pieces of information sensed in at least two sensors among the aforementioned sensors.

The output part 150 can generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen can also function as the user input part 123 that provides an input interface between the electronic apparatus 100 and a user and simultaneously, provide an output interface between the electronic apparatus 100 and the user.

The acoustic output part 152 can output audio data stored in the memory 170 or received from the wireless communication part 110 in, for example, a call signal reception, a call mode or a recording mode, a voice recognition mode, and a broadcast reception mode. The acoustic output part 152 can output an acoustic signal related to a function (for example, a call signal reception sound and a message reception sound) performed in the electronic apparatus 100. For example, the acoustic output part 152 may include at least one of a receiver, a speaker, or a buzzer.

The haptic part 153 can generate various tactile effects to be experienced by a user. A vibration is a representative example of the tactile effects generated by the haptic part 153. An intensity and a pattern of the vibration generated by the haptic part 153 can be determined based on a selection of a user or setting of the controller 180. For example, the haptic part 153 can output a combination of different vibrations or output different vibrations in sequence.

The optical output part 154 can output a signal to announce an event occurrence using light of a light source of the electronic apparatus 100. An event occurring in the electronic apparatus 100 may be, for example, message reception, a call signal reception, missed call, alarm, schedule notification, e-mail reception, and application-based information reception.

The interface 160 can function as a passage to various types of external devices connected to the electronic apparatus 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic apparatus 100 can perform an appropriate control associated with the connected external device.

The memory 170 can store data supporting various functions of the electronic apparatus 100. The memory 170 can store application programs (or applications) run in the electronic apparatus 100, data for operation of the electronic apparatus 100, and instructions. At least a portion of the application programs may be downloaded from an external server through wireless communication. Also, at least a portion of the application programs may exist in the electronic apparatus 100 for a basic function (for example, call forwarding and outgoing function and message receiving and outgoing function) of the electronic apparatus 100 from the time of manufacture. The application program can be stored in the memory 170, installed in the electronic apparatus 100, and run by the controller 180 to perform an operation (or function) of the mobile terminal.

The controller 180 generally controls an overall operation of the electronic apparatus 100 in addition to operations related to the application programs. The controller 180 can process a signal, data, information, and the like input or output through the aforementioned components or run the application program stored in the memory 170, thereby providing information to a user or performing appropriate information or function.

Also, to run the application program stored in the memory 170, the controller 180 can control at least a portion of the components shown in FIG. 1. Furthermore, to run the application program, the controller 180 can operate a combination of two or more components among the components included in the electronic apparatus 100.

The power supply 190 can supply power to each component included in the electronic apparatus 100 by receiving external or internal power under a control of the controller 180. The power supply 190 may include a battery such as a built-in battery or a removable battery.

At least a portion of the aforementioned components can operate in cooperation with each other to implement an operation, a control, or a control method of the mobile terminal according to various embodiments as described below. Also, the operation, control, or control method of the mobile terminal can be implemented on the mobile terminal through an execution of at least one application program stored in the memory 170.

The electronic apparatus 100 may be in a bar shape but is not limited thereto. The electronic apparatus 100 can also have various shapes within the scope of the present disclosure. In the present disclosure, the electronic apparatus 100 may refer to a mobile terminal obtained by applying a flexible display to the above-described mobile terminal. The flexible display may refer to a flexible display to be bent such that a winding area is changed.

The flexible display can refer to a lightweight and durable display manufactured on a thin and flexible substrate so as to be curved, bendable, folded, twisted, or rolled like a paper while having a characteristic of a typical flat panel display. The flexible display can implement a flexible touch screen in combination with a touch sensor. In response to a touch being input through the flexible touch screen, the controller 180 can perform a control corresponding to the touch input.

Further, the touch sensor can sense a touch (or touch input) applied to the touch screen based on at least one of various touch types including a resistive type, a capacitive type, an infrared type, an ultrasonic type, and a magnetic field type. As an example, the touch sensor can be configured to convert a change such as a pressure applied to a predetermined portion of the touch screen or a capacitance generated at the predetermined portion into an electrical input signal. The touch sensor can detect a position at which a touch object applying a touch on the touch sensor is touched on the touch sensor, an area, a touch pressure, a touch capacitance, and the like.

The electronic apparatus 100 may include a deformation detection mechanism that detects a deformation of the flexible display. The deformation detection mechanism may be included in the sensing part. Information related to the deformation may include, for example, a direction in which the flexible display is deformed, a degree of deformation, a deformed position, a deformation time, and an acceleration at which the deformed flexible display is restored. In addition, the information related to the deformation can be various information to be detected in response to the flexible display being bent.

Also, based on the information related to the deformation of the flexible display detected by the deformation detection mechanism, the controller 180 can change information displayed on the flexible display or generate a control signal for controlling functions of the electronic apparatus 100.

A state change of the flexible display, for example, an expansion or reduction of a front surface area can occur due to an external force but not be limited thereto. For example, the front surface area of the flexible display can be expanded or reduced by the user or based on a command of an application. A driver may also be included to change the state of the flexible display without applying the external force.

When the flexible display covers from the front surface to a rear surface, a space implemented in a typical rear case to mount an antenna can be restricted. Thus, the antenna may be embodied on the flexible display. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed to be the flexible display 151 unless otherwise state.)

Figure 2:
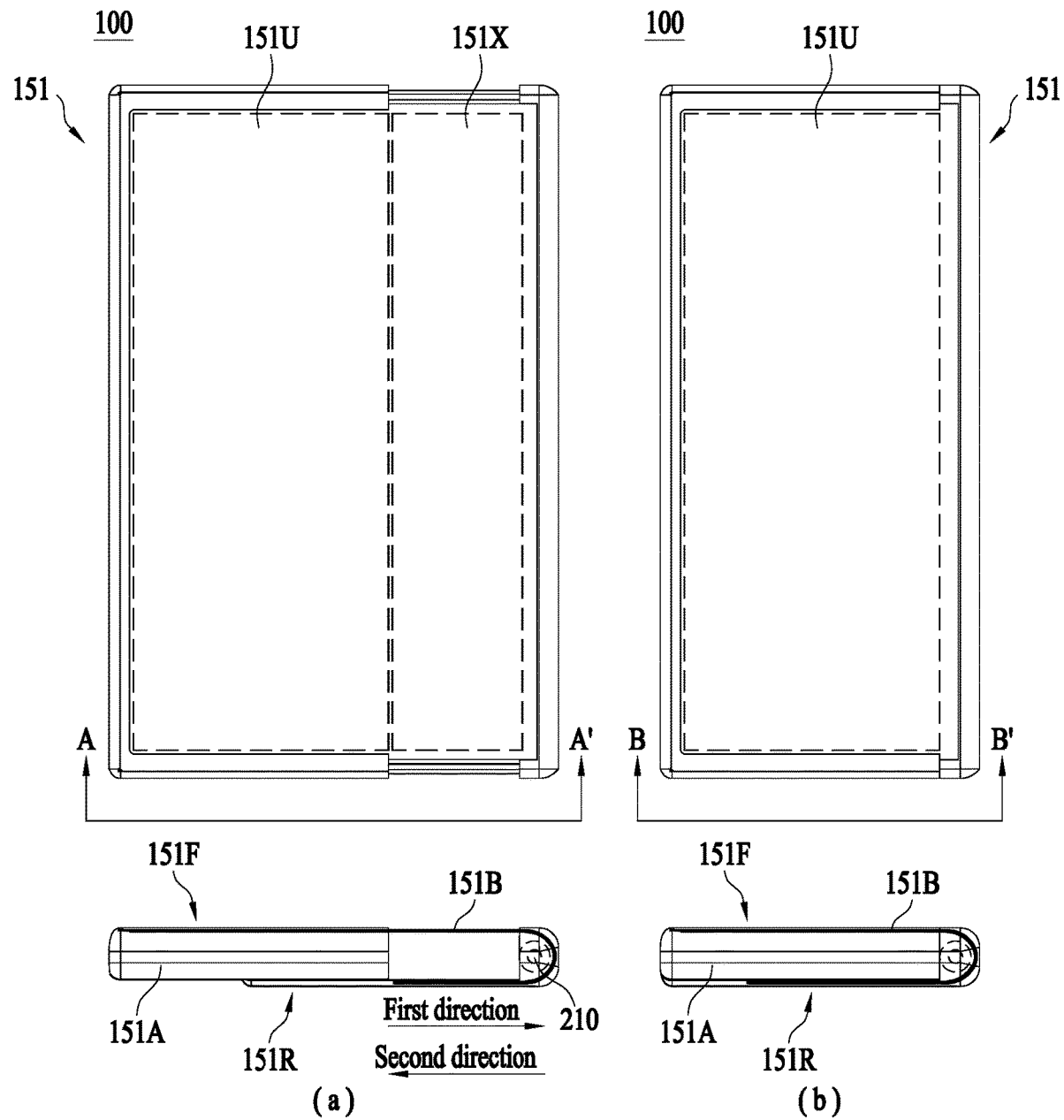
FIGS. 2 and 3 are conceptual diagrams of an electronic apparatus obtained before and after an expansion of a display of the electronic apparatus related to the present disclosure.
Figure 3:
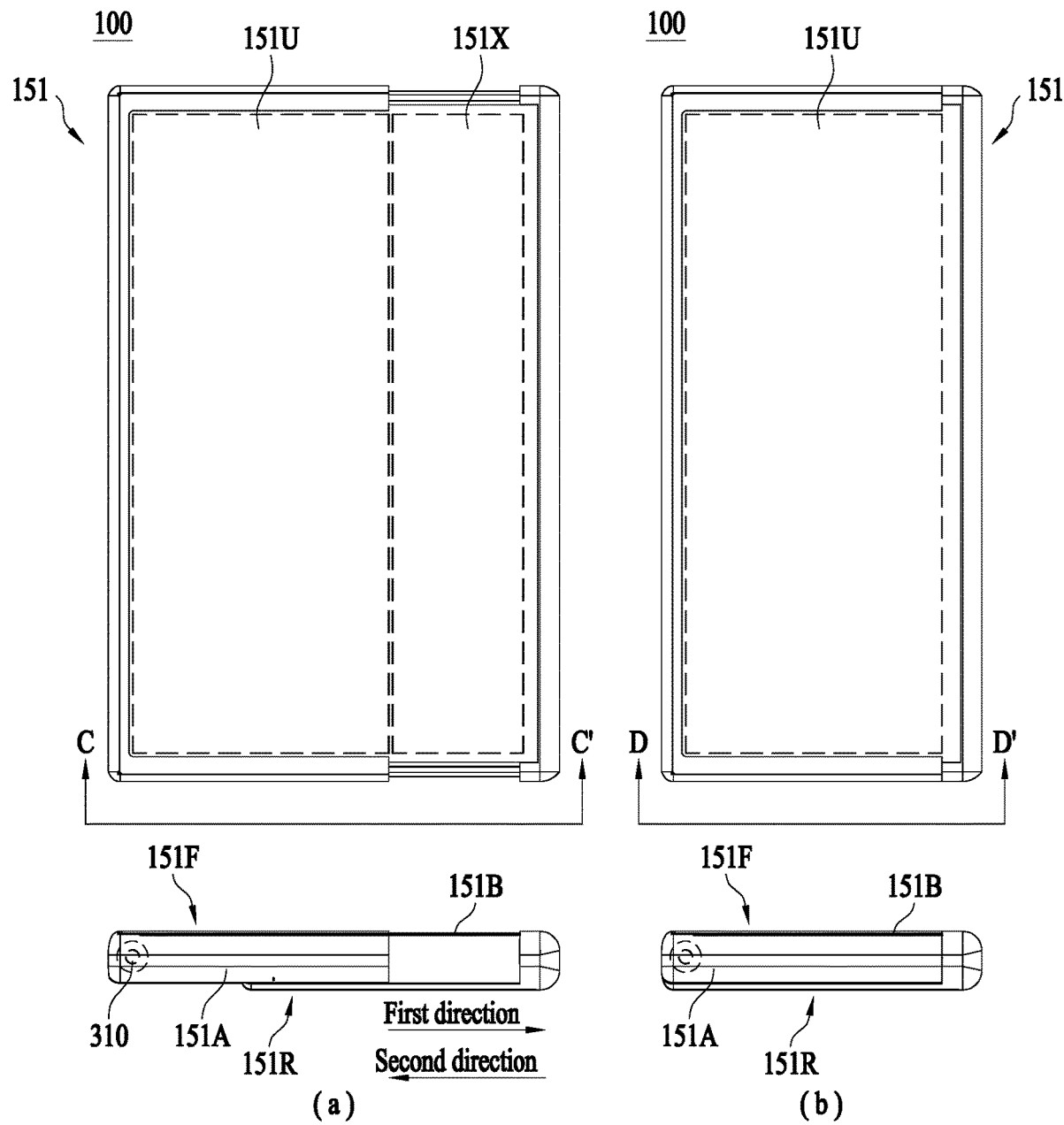

Next, FIGS. 2 and 3 are conceptual diagrams illustrating the states before and after a display 151 of an electronic apparatus 100 related to an embodiment of the present disclosure is extended. Specifically, FIG. 2 illustrates when an edge on which a display 151 is rolled up and out in relation to extension is a first direction edge 210, and FIG. 3 illustrates when an edge on which the display 151 is rolled up and out in relation to extension is a second direction edge 310 that opposes the first direction edge 210. Specifically, (a) in FIG. 2 illustrates an electronic apparatus 100 with the display 151 which is extended, and (b) in FIG. 2 illustrates the electronic apparatus 100 with the display 151 which is not extended.

Referring to FIG. 2, the display 151 may have one side fixed at a front surface with reference to the electronic apparatus 100 and can be rolled up on a first direction edge 210 to be provided on a back surface (or a rear surface). A front region 151F of the display 151 can be extended. When the front region 151F of the display 151 is extended, a rear region 151R of the display 151 is reduced. On the contrary, when the front region 151F of the display 151 is reduced, the rear region 151R of the display 151 is extended.

A direction in which the front region 151F of the display 151 is extended can be defined as a first direction, and a direction in which the front region 151F of the display 151 is reduced can be defined as a second direction. In this instance, if the front region 151F of the display 151 increases in area, the first direction edge 210 of the display 151 can move in the first direction, and, if the front region 151F of the display 151 decreases in area, the first direction edge 210 of the display 151 can move in the second direction.

In order to guide and support the display 151 to be extended or retracted, a frame (or a case) supporting the display 151 can be extended or retracted as well. The frame may include a first frame 151A and a second frame 151B, which slidably moves in the first direction relative to the first frame 151A.

A part of the front region 151F to be maintained regardless of extension and retraction of the display 151 can be defined as a fixed part 151U. A part of the front region 151F to be selectively exposed according to extension and retraction of the display 151 can be defined as a variable part 151X. When the front region 151F of the display 151 is extended, the fixed part 151U of the display 151 can be positioned at the first frame 151A and the variable part 151X of the display 151 can be positioned at the second frame 151B.

When the second frame 151B slidably moves in the first direction to be extended from the first frame 151A, the front region 151F of the display 151 can be extended, causing the fixed part 151U and the variable part 151X to be exposed at the front surface. When the second frame 151B slidably moves in a direction opposite to the first direction to be retracted toward the first frame 151A, the front region 151F of the display 151 can be reduced as well, causing only the fixed part 151U to remain exposed at the front surface.

In addition, the rear region of the display 151 can be exposed at a rear surface of the second frame 151B. The rear region of the display 151 can also be covered by a light-transmitting rear window and therefore visible from the outside.

Further, the front region 151F of the display 151 can be exposed at a front surface without an additional window. In some cases, however, a deco frame can cover a boundary region between the front region 151F and the first frame 151A, thereby preventing an external material and covering a bezel region of the electronic apparatus to help visibility of a screen for a user.

An electronic part can be formed in an inner surface formed by external structures such as the first frame 151A and the second frame 151B. An electronic component for driving the electronic apparatus 100, such as a battery 191, can be mounted at a main Printed Circuit Board (PCB) and thus provided in the electronic part. Alternatively, an electronic component such as an internal antenna module can be mounted directly at the electronic part rather than mounted at the main PCB.

In an embodiment, the electronic apparatus 100 may include a driving part for controlling a size of the display 151. The driving part may be implemented, for example, using a motor. The electronic apparatus 100 can control a size of the display 151 by controlling a moving direction of the first direction edge 210 of the display 151 using a motor.

Specifically, (a) of FIG. 3 illustrates an electronic apparatus 100 with a display 151 which is extended, and (b) of FIG. 3 illustrates the electronic apparatus 100 with the display 151 which is not extended. Referring to FIG. 3, the display 151 can have one side fixed at a front region with reference to the electronic apparatus 100 and can be rolled up on a second direction edge 310 to be provided over a back surface (or a rear surface). A front region 151F of the display 151 can be extended. When the front region 151F of the display 151 is extended, a rear region 151R of the display 151 can be reduced. On the contrary, when the front region 151F of the display 151 is reduced, the rear region 151R of the display 151 can be extended.

A direction in which the front region 151F of the display 151 is extended can be defined as a first direction, and a direction in which the front region 151F of the display 151 is reduced can be defined as a second direction. In this instance, even when the front region 151F of the display 151 increases or decreases in area, the second direction edge 310 of the display 151 can remain at the same position. A redundant description of FIG. 3 with FIG. 2 will be omitted.

In FIGS. 2 and 3, the display is described as being extended in the first direction, but is not limited thereto. For example, the display can be extended in the second direction. In the following description, the display can be extended in various directions (e.g., the first direction or the second direction).

Figure 4:
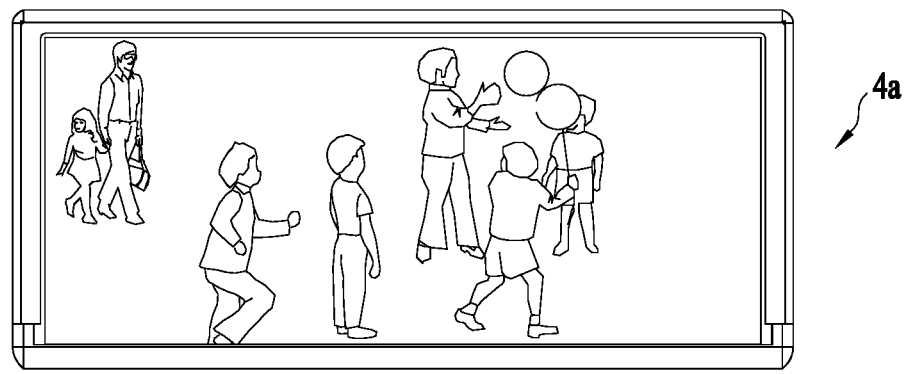
FIG. 4 illustrates content displayed on a first surface of an electronic apparatus according to an example embodiment of the present disclosure.
Figure 4:
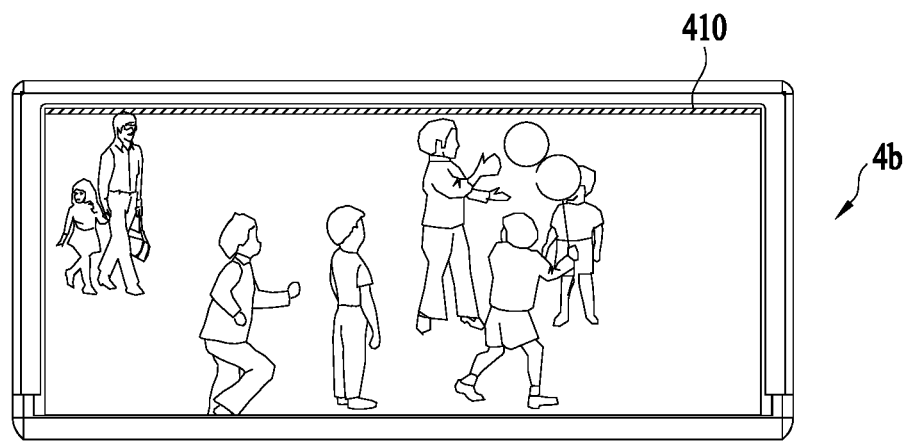
Figure 4:
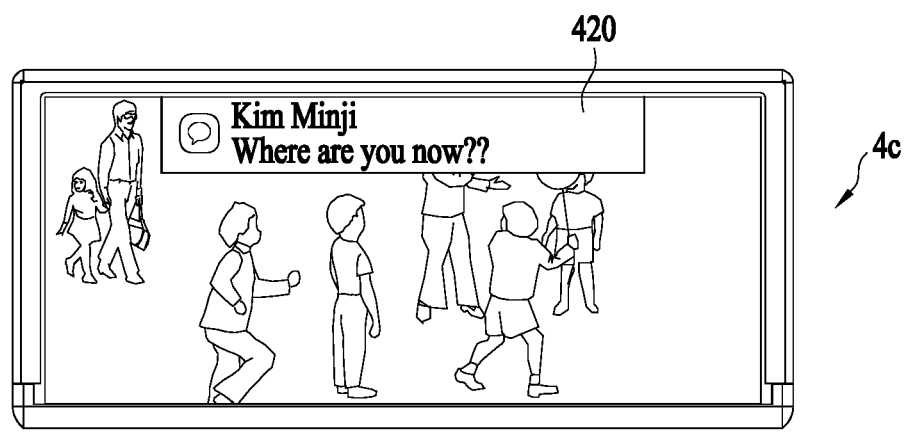

Next, FIG. 4 illustrates content displayed on a first surface of an electronic apparatus according to an example embodiment of the present disclosure. Reference numeral 4a represents content is displayed on a first surface (e.g., a front surface) of an electronic apparatus. The content displayed on the first surface of the electronic apparatus may include visual content to be viewed, for example, a video and an image.

Reference numeral 4b represents an event occurs in the electronic apparatus while the content is displayed on the first surface. The event can be related to a notification. Specifically, the event can comprise a state be requested to providing the notification by displaying content (for example: the notification-related content 420), like image or text, on the first surface. In this instance, as illustrated, event-related information (or notification information) 410 can be displayed in at least a portion of the first surface of the electronic apparatus.

Specifically, the event-related information 410 can be displayed at an upper end of a display placed horizontally as indicated by the reference numeral 4b. Here, the event-related information 410 can include predetermined information indicating that the event occurs or the event is received. For example, the event-related information 410 may include a specific image or an image in a specific color but is not limited thereto. In some cases, the event-related information 410 may include a sound or a light emitting pattern for at least a portion of the display.

In the example embodiment, the event-related information 410 may include content of a different type for each event. For example, when an event is related to a message reception, the event-related information 410 may include first content. Also, when an event is related to a call reception, the event-related information 410 may include second content.

In addition, the event-related information 410 is displayed for a predetermined time. In some cases, after the predetermined time elapses, displaying of the event-related information 410 can be suspended and a screen of the reference numeral 4a can be displayed.

Further, the electronic apparatus can receive a specific input corresponding to the event related to the notification. The specific input may include a user input to a specific position (e.g., at least a portion of a second surface) of the display. In response to the specific input being received, the electronic apparatus can display content (or notification-related content) 420 as indicated by reference numeral 4c.

The content 420 may include content corresponding to the notification and content associated with information to be indicated through the notification. As an example, the content 420 may include at least one of a text and an image related to the notification. As another example, when an application providing the notification is a messenger application, the content 420 may include a message. The content 420 can be displayed in at least a portion of the first surface of the electronic apparatus. For example, the content 420 is displayed at an upper end of the display placed horizontally.

Figure 5:
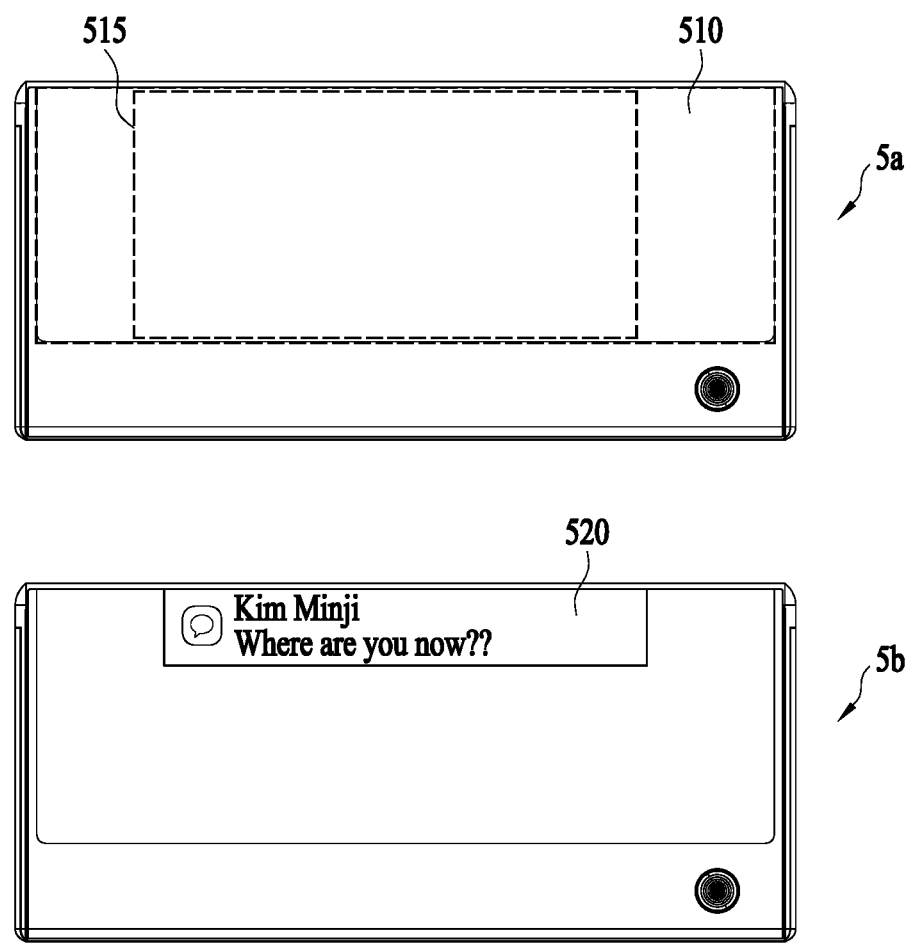
FIG. 5 illustrates content displayed on a second surface of an electronic apparatus according to an example embodiment of the present disclosure.

Next, FIG. 5 illustrates content displayed on a second surface of an electronic apparatus according to an example embodiment of the present disclosure. Reference numeral 5a represents an example of a second surface of an electronic apparatus. A portion 510 of a display can be located at the second surface of the electronic apparatus. The display can be wound on one surface of the electronic apparatus to be located at a first surface and the second surface. The portion 510 of the display shown in FIG. 5 may be a display located at the second surface.

Specifically, the display can be located in at least a portion of the second surface. As illustrated, the display can be located to occupy an overall upper end portion of the second surface but is not limited thereto. The portion 510 of the display can be located to correspond to a specific area, for example, an area 515.

Reference numeral 5b represents an example of displaying notification-related content 520 on a display of the second surface. In the example embodiment, the notification-related content 520 can be displayed on the display of the second surface based on an event related to a notification. As an example, the notification-related content 520 can be displayed in response to the notification being received. As another example, the notification-related content 520 can be displayed on the display of the second surface while the screen of the reference numeral 4b of FIG. 4 is on the display of the first surface.

The notification-related content 520 can be displayed in at least a portion of the display of the second surface. For example, the notification-related content 520 can be displayed in a portion of an upper end of the display placed horizontally. In addition, when the display corresponds to the area 515 of the reference numeral 5a, the notification-related content 520 can be displayed in the area 515.

Figure 6:
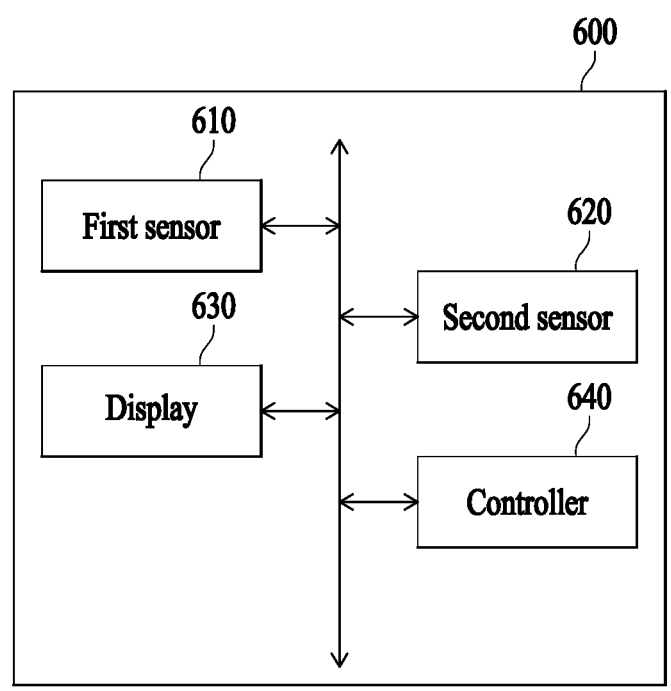
FIG. 6 is a functional block diagram illustrating an electronic apparatus according to an example embodiment of the present disclosure.

Next, FIG. 6 is a functional block diagram illustrating an electronic apparatus according to an example embodiment of the present disclosure. As described below, an element of an electronic apparatus 600 may be a unit that processes at least one function or operation and may be implemented through hardware, software, or a combination of hardware and software.

The electronic apparatus 600 includes a first sensor 610, a second sensor 620, a display 630, and a controller 640. In some cases, the first sensor 610 or the second sensor 620 may be omitted. The first sensor 610 may include a proximity sensor. Specifically, the first sensor 610 may include a proximity sensor that senses a living body or an object approaching within a predetermined radius. The first sensor 610 can be disposed in at least a portion of the electronic apparatus 600. For example, the first sensor 610 can be disposed in an upper portion of a first surface (e.g., a front surface) of the electronic apparatus 600.

The second sensor 620 may include a pose recognition sensor. Specifically, the second sensor 620 may include a pose recognition sensor (e.g., a gyro sensor) that detects a pose (e.g., landscape or portrait orientation) of the electronic apparatus 600 including the second sensor 620. That is, the second sensor 620 can detect whether a pose of the electronic apparatus 600 is horizontal or vertical. However, embodiments are not limited thereto. In addition, the second sensor 620 can detect whether the electronic apparatus 600 is upside down.

A size by which the display 630 is exposed on a first surface of the electronic apparatus 600 (e.g., a front surface of the electronic apparatus 600) can be changed. As discussed previously, the display 630 may be implemented to be flexible.

In addition, the display 630 can display a variety of information associated with an operation of the electronic apparatus 600. For example, the display 630 can display content of an application provided based on an execution of the application or content representing the application.

In addition, a portion of the display 630 can be located at the first surface. Also, another portion of the display 630 can be wound at one surface of the electronic apparatus 600 to be located at a second surface of the electronic apparatus 600. Here, the first surface may include the front surface of the electronic apparatus 600 and the second surface may include a rear surface of the electronic apparatus 600 facing the first surface.

Specifically, the display 630 can be bent at one end in contact with the first surface, so that at least a portion of the display 630 is located at the first surface and at least another portion of the display 630 is located at the second surface in contact with the one end. Since the related description has been made with reference to FIG. 2 or 3, repeated description is omitted.

In addition, the controller 640 can display application-related content in a first area. The first area may include an area of at least a portion of the display located at the first surface of the electronic apparatus 600. That is, the controller 640 can display the content related to the application in the first area of the first surface. The application-related content may include, for example, visual content to be viewed by a user such as multimedia but not limited thereto.

In addition, the controller 640 can identify a notification-related event. The notification-related event may include an event set to provide a notification. For example, the notification-related event may include a situation in which a message is received. The notification may also include information indicating that the message is received.

The controller 640 can also display event-related information in at least a portion of the first area in response to the notification-related event. For example, when the first area corresponds to the entire display located at the first surface, the controller 640 can display the event-related information in an area in an upper end portion of the first area.

The event-related information may include specific content. The event-related information may include, for example, a specific image or a specific light emitting pattern. Here, the specific light emitting pattern may include a pattern for a color or a brightness of at least a portion of the display. This is merely an example of the event-related information and the event-related information may be implemented as various content.

In one embodiment, the event-related information may be designated for each event. For example, when an event is related to a message reception, the event-related information can be designated to first content. Also, when an event is related to a game invitation, the event-related information can be designated to second content.

In addition, the event-related information can be designated for each application. For example, when an alarm event is related to a first application, the event-related information can be designated to first content. Also, when an alarm event is related to a second application, the event-related information can be designated to second content. Here, the first content and the second content may be implemented to have the same configuration and different colors. However, this is merely an example and the first content and the second content may also be implemented as content having different configurations.

In response to a first input to a second area, the controller 640 can display at least a portion of notification-related content in the first area. The second area may include an area of a displayed located at a second surface (e.g., a rear surface) of the electronic apparatus 600.

The notification-related content may include content corresponding to a target for notification. As an example, when a notification informs of a message reception, the notification-related content may include a received message. As another example, when a notification informs of a game invitation, the notification-related content may include at least one of a text and an image showing details of the game invitation.

The electronic apparatus can store the notification-related content corresponding to the notification-related event. In some cases, a plurality of notification-related events may occur. In such cases, the electronic apparatus can store notification-related content corresponding to each of the notification-related events.

The first input may be an input designated in advance. As an example, the first input may include a touch input to the second area. As another example, the first input may include a touch input to the first area. In some cases, the first input may include an input applied to a specific point or an input to at least one point. However, the aforementioned examples are not to be taken as being limited thereto.

In addition, the first input may include an input maintained for a predetermined time. For example, the first input may include an input of which a touch is maintained for a first period of time. In this example, the controller 640 can display at least a portion of the notification-related content in the first area for the first period of time, that is, a time in which the first input is maintained.

In addition, the controller 640 can identify a second input to a proximity sensor. In this instance, the controller 640 can display at least a portion of the notification-related content in the first area in response to the second input. The second input may be included in the first input or may include an input maintained for a predetermined time as described above. In such a case, the controller 640 can display at least a portion of the notification-related content in the first area for a time in which the second input is maintained.

Further, the controller 640 can activate an input detection for the second area based on an event. The controller 640 can identify an input applied to the second area in response to the input detection being activated. The controller 640 can also set for an input to be detected from the second area in response to the event being identified, and identify an input applied to the second area.

In addition, in a general situation irrelevant to the event, the controller 640 can deactivate the input detection for the second area. The deactivation of the input detection may include a situation in which an applied input is neglected or the input detection is not performed due to a power blockage. Once the input detection is deactivated, even if an input is applied to the second area, the controller 640 can neglect the input. Alternatively, the input to the second area may not be detected by the controller 640.

Further, the controller 640 can display at least a portion of the notification-related content in the second area. As an example, the controller 640 can display at least a portion of the notification-related content in the second area based on the notification-related event. As another example, when the notification-related event is identified, the controller 640 can display at least a portion of the notification-related content in the second area for a predetermined time.

The controller 640 can control at least one of a display brightness corresponding to the first area and a display brightness corresponding to the second area based on a pose of the electronic apparatus 600. As an example, when a pose of the electronic apparatus 600 is a first pose, the controller 640 can adjust the display brightness corresponding to the first area to a first brightness and adjust the display brightness corresponding to the second area to a second brightness. In some cases, the notification-related content can be displayed in the second area.

As an example, the notification-related content can be displayed in the second area and a pose of the electronic apparatus 600 may be a second pose. In this example, the controller 640 can adjust the display brightness corresponding to the first area to the second brightness and adjust the display brightness corresponding to the second area to the first brightness.

In the foregoing examples, the first brightness may be higher than the second brightness and the first pose may include a pose of a user gazing at the first area. Also, the second pose may include a pose of the user gazing at the second area or a pose at which the first surface is located at the bottom and the second surface is exposed. An example of the pose at which the first surface is located at the bottom and the second surface is exposed will be described in detail with reference to FIG. 14.

In the example embodiment, when the electronic apparatus 600 corresponds to the second pose, the controller 640 can set the display of the second surface to an always-on-display (AOD) state. In this instance, the controller 640 can display the notification-related content in the second surface based on the notification-related event. Related description will be made with reference to FIG. 14.

In the example embodiment, the controller 640 can identify a third input to the notification-related content. The third input may include, for example, an input of touching the notification-related content. In this instance, the controller 640 can provide a user interface (UI) related to the content.

For example, the controller 640 can identify the third input applied by touching the notification-related content displayed in the second area. The notification-related content may correspond to a message. The controller 640 can also display an input UI (e.g., a keyboard UI) for inputting the message in response to the third input.

When the notification-related content is plural, the controller 640 can provide at least a portion of the content. As an example, when the notification-related content includes a plurality of messages, the controller 640 can display a message received first. As another example, when the notification-related content includes a plurality of messages, the controller 640 can display the entire message received first and at least a portion of remaining messages. Related description will be made with reference to FIG. 9.

In addition, the controller 640 can display application-related content in the second area in response to a fourth input to the first area. Specifically, in response to the fourth input to the first area being identified, the controller 640 can relocate the application-related content displayed in the first area to be displayed in the second area.

In some cases, the controller 640 can suspend displaying the application-related content in the first area. Also, in some other cases, a size of the application-related content displayed in the first area may differ from a size of the application-related content displayed in the second area. However, embodiments are not limited thereto. Related description will be made with reference to FIG. 10.

When the application-related content is displayed in the second area and a fifth input to the second area is identified or received, the controller 640 can display at least a portion of the application-related content in the first area in response to the fifth input. Specifically, the controller 640 can identify the fifth input to the second area in a state in which the application-related content is displayed in the second area. In this instance, the controller 640 can relocate a portion of the application-related content displayed in the second area to be displayed in the first area.

In some cases, the controller 640 can relocate at least a portion of the application-related content displayed in the second area so as to be displayed in the first area in a form of picture in picture (PIP) in response to the fifth input. In such cases, the application-related content displayed in the first area and the content displayed in response to the fifth input may be used in parallel. Related description will be made with reference to FIG. 11.

In addition, the controller 640 can display at least a portion of the application-related content in the first surface in response to an increase in a size of the display 630 exposed on the first surface. Specifically, at least a portion of the second area may be located in the first area in response to the increase in the size of the display 630. In this instance, the controller 640 can relocate at least a portion of the application-related content displayed in the second area to be displayed in an area (e.g., the first area or at least a portion of the second area) of the display located at the first surface. Related description will be made with reference to FIG. 11.

The controller 640 can generate at least one image of content displayed in the first area in response to a sixth input. For example, when the sixth input that triggers image capturing is identified, the controller 640 can generate a captured image of the content displayed in the first area. In some cases, the at least one generated image may be displayed in the second area. Related description will be made with reference to FIG. 12.

The controller 640 can display a portion of at least one image generated in response to a seventh input, in the first area. The seventh input may include, for example, an input to the second area. For example, when the seventh input to the second area is identified, the controller 640 can display one of captured images in the first area. Here, a captured image displayed in the first area may include a most recently captured image.

In some cases, the controller 640 can select a portion of one or more images displayed in the first area based on an eighth input. For example, when the eighth input includes a first touch input and a second touch input, the controller 640 can select at least a portion of another image of the one or more images as an image to be displayed in the first area in response to a position change of the first touch input. Here, the other image may include an image distinguished or different from the portion of the images displayed in the first area based on the eighth input. Related description will be made with reference to FIG. 13.

Figure 7:
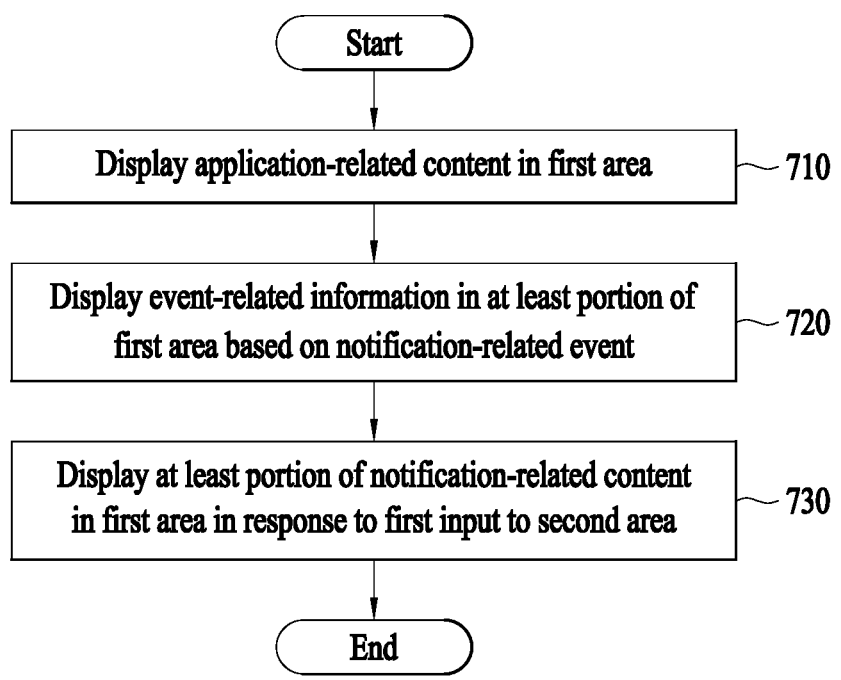
FIG. 7 is a flowchart illustrating a control method of an electronic apparatus according to an example embodiment of the present disclosure.

Next, FIG. 7 is a flowchart illustrating a control method of an electronic apparatus according to an example embodiment of the present disclosure. In some cases, operations of FIG. 7 can be performed in a different order from that shown in the drawing. Since the description of FIGS. 4 through 6 applies here, a repeated description of FIG. 7 will be omitted.

Referring to FIG. 7, in operation 710, an electronic apparatus can display application-related content in a first area. The first area may include at least a portion of a display located at a first surface (e.g., a front surface) of the electronic apparatus. The electronic apparatus can display the application-related content in the first area in response to an application being executed.

In addition, the display can also be located at a second surface (e.g., a rear surface) of the electronic apparatus. Hereinafter, at least a portion of the display located at the second surface of the electronic apparatus may also be referred to as "second area." However, embodiments of the present disclosure are not limited by such terminology.

The electronic apparatus can identify or receive a notification-related event. For example, when a specific condition is satisfied, a notification indicating that the condition is satisfied can be generated from an application installed in the electronic apparatus. In this example, the notification-related event can refer to a state in which the notification is generated. However, this is merely an example, and the notification-related event can also refer to various states in which a notification is generated or received.

In operation 720, the electronic apparatus can display event-related information in at least a portion of the first area based on the notification-related event. Specifically, when the notification-related event is identified, the electronic apparatus can display the event-related information in at least a portion of the first area. The event-related information may include content providing a notification indicating that an event occurs, for example, an image with a specific color. The event-related information is not limited to the foregoing example and includes various types of information.

The event-related information can be displayed in a predetermined position in the first area. For example, the event-related information can be displayed adjacent to a bar in an upper portion of the first area. In some cases, the event-related information may include different content (e.g., content in different colors) for each application related to an alarm event. In such cases, information associated with the application related to the alarm event may be provided to a user along with the event-related information.

In addition, the electronic apparatus can display notification-related content in at least a portion of the second area based on the notification-related event. The notification-related content may include content corresponding to a target for notification. For example, when a notification indicates an arrival of a message, the notification-related content may include the message.

At least a portion of the second area in which the notification-related content is displayed may be designated in advance. Accordingly, the electronic apparatus can display the notification-related content in the corresponding portion of the second area based on the notification-related event.

Also, the notification-related content can be displayed for a predetermined time. When the predetermined time elapses, the notification-related content can be unmarked. In some cases, in response to the notification-related content being unmarked, predetermined content can be displayed in the second area. The predetermined content may be content indicating that a history of receiving the notification-related content is present. Related description will be made with reference to FIG. 9.

In operation 730, the electronic apparatus can display at least a portion of the notification-related content in the first area in response to the first input to the second area. The first input to the second area may be a predetermined input and include an input applied to the second area. The first input may be implemented in various types of inputs, for example, a touch input to a plurality of positions.

When the notification-related content is provided in plural, the electronic apparatus can display at least a portion of the notification-related content in the first area located on the first surface in response to the first input. The corresponding portion displayed in the first area may include, for example, content of which a notification is most recently identified among the notification-related content.

Further, the first input may be maintained for a predetermined time. In this instance, the electronic apparatus can display at least a portion of the notification-related content in the first area for the predetermined time.

Figure 8:
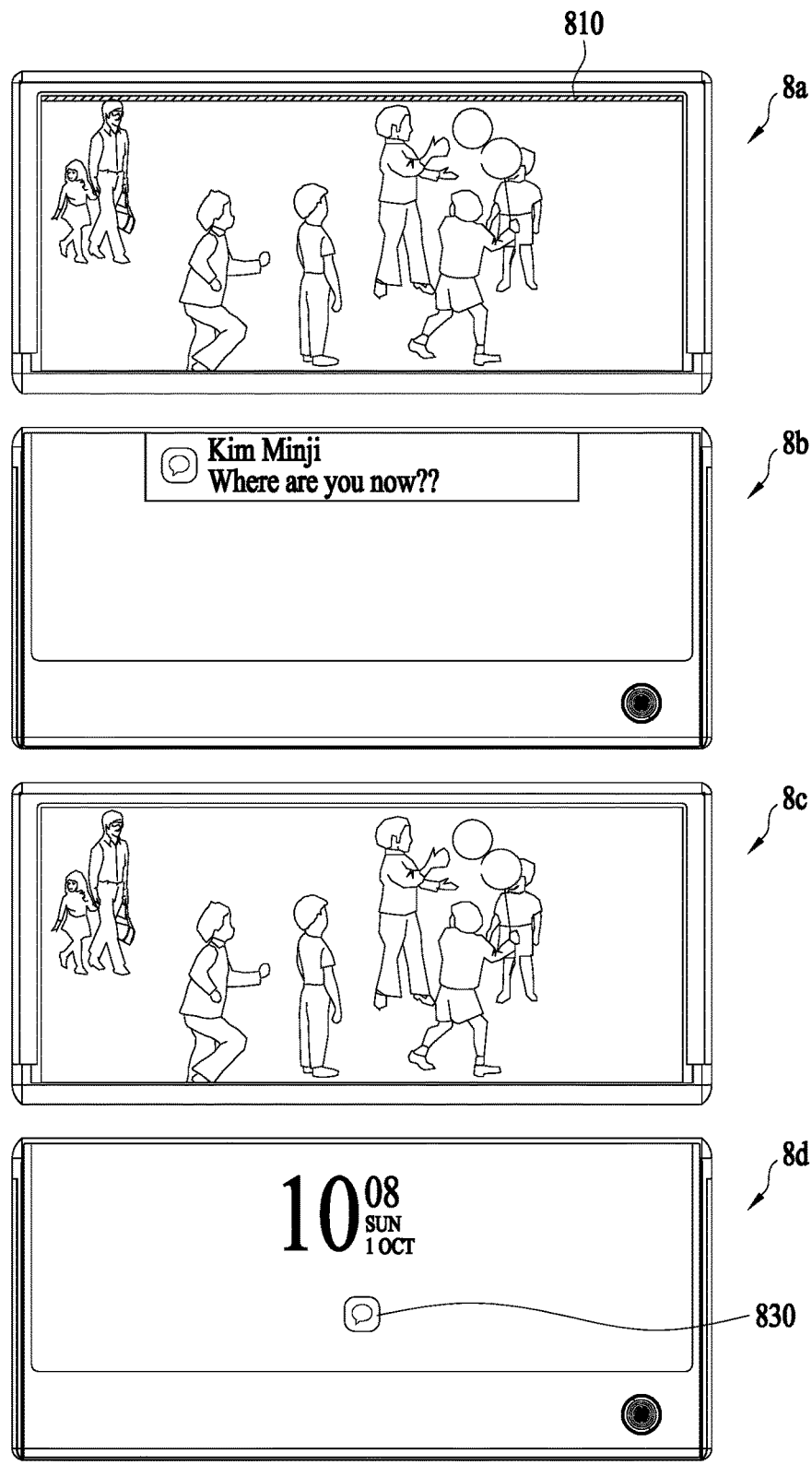
FIG. 8 illustrates an example of content displayed on a first surface or a second surface of an electronic apparatus according to an example embodiment of the present disclosure.

Next, FIG. 8 illustrates an example of content displayed on a first surface or a second surface of an electronic apparatus according to an example embodiment of the present disclosure. Reference numeral 8a represents an example of a screen displayed on a first surface in response to a notification-related event, that is, when the notification-related event occurs. As indicated by the reference numeral 8a, event-related information 810 can be displayed on the first surface. The event-related information 810 can include an image in a specific color and be displayed to correspond to a first area designated in advance.

As illustrated, the event-related information 810 can be displayed in the first area of the first surface in a state in which application-related content is displayed on the entire first surface overall. Although image content is shown as an example of the application-related content indicated by the reference numeral 8a, embodiments are not limited thereto.

Reference numeral 8b represents an example of a screen in which notification-related content 820 is displayed in a second area. In some cases, a notification-related event can be a plurality of notification-related events so that the notification-related content 820 includes a plurality of items of content. In such cases, the notification-related content 820 can include at least a portion of the items of content. An example of the notification-related content 820 indicating at least a portion of the items of content will be described with reference to FIG. 9.

In addition, the reference numerals 8a and 8b can be displayed correspondingly. Specifically, the reference numeral 8a corresponding to the notification-related event can be displayed on the first surface and the reference numeral 8b corresponding to the notification-related event can be displayed on the second surface.

The reference numeral 8c represents an example of a screen displayed before an event related to the reference numeral 8a is identified or after a predetermined time elapses from the identifying of the event. Specifically, the electronic apparatus can display the event-related information 810 for the predetermined time in response to the event and omit the event-related information 810 after the predetermined time elapses as indicated by the reference numeral 8c.

Reference numeral 8d represents an example of a screen displayed in the second area after the predetermined time elapses from the identifying of the event. Specifically, the reference numeral 8d can include a screen displayed in addition to the screen of the reference numeral 8c after the predetermined time elapses. As represented by the reference numeral 8d, information indicating that a history of displaying the notification-related content is present, for example, an icon 830 can be displayed in the second area.

Also, in response to an input to the icon 830 being identified, the electronic apparatus can display the screen as indicated by the reference numeral 8c. However, this is merely an example, and the electronic apparatus can display the notification-related content in various ways in response to an input to the icon 830.

In addition, the electronic apparatus can identify a pose of the electronic apparatus. The electronic apparatus can also control at least one of a display brightness of the first area and a display brightness of the second area based on the identified pose. When the pose of the electronic apparatus is a first pose, the electronic apparatus can control the display brightness of the first area to be a first brightness and control the display brightness of the second area to be a second brightness. When the pose of the electronic apparatus is a second pose, the electronic apparatus controls the display brightness of the first area to be the second brightness and control the display brightness of the second area to be the first brightness.

Here, the first brightness is higher than the second brightness. The first pose refers to a pose of a user gazing at the first surface of the electronic apparatus. The second pose refers to a pose of the user gazing at the second surface of the electronic apparatus. Since it is obvious to those skilled in the art that various known techniques are applicable to pose identification of the electronic apparatus, repeated description will be omitted.

Further, the reference numerals 8c and 8d can be displayed correspondingly. Specifically, the reference numeral 8c can be displayed on the first surface after a predetermined time elapses from the identifying of the notification-related event and the reference numeral 8d can be displayed on the second surface after the predetermined time elapses from the identifying of the notification-related event.

Figure 9:
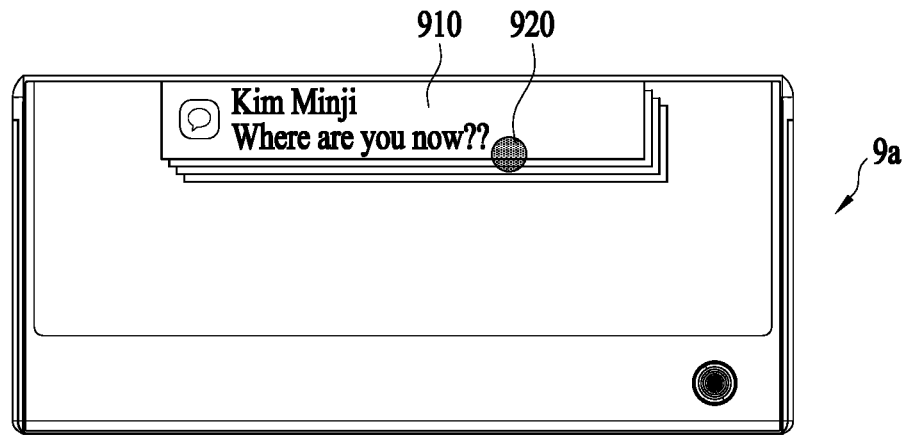
FIG. 9 illustrates an example of displaying content on an electronic apparatus according to an example embodiment of the present disclosure.
Figure 9:
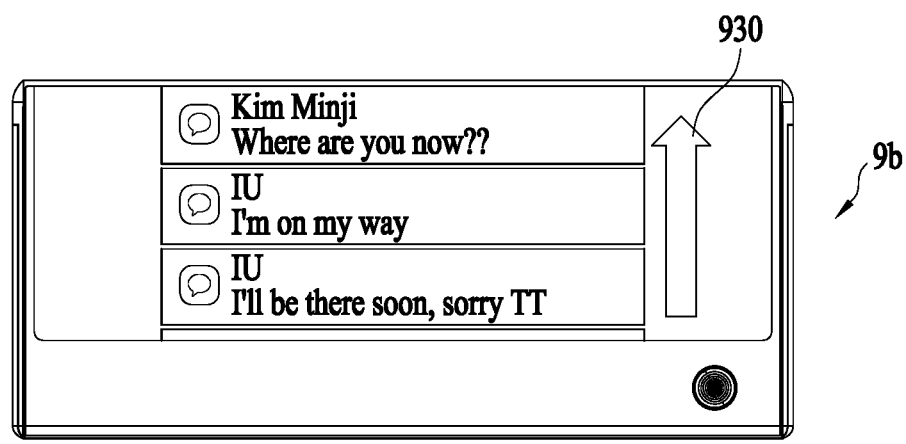
Figure 9:
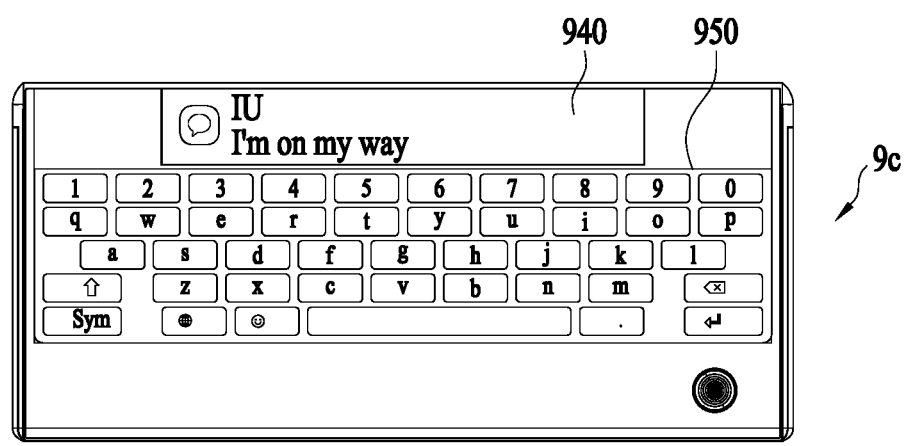

Next, FIG. 9 illustrates an example of displaying content on an electronic apparatus according to an example embodiment of the present disclosure. Specifically, FIG. 9 illustrates an example of displaying content on a display located at a second surface.

Reference numeral 9a represents an example of displaying notification-related content 910 provided in plural. As indicated by the reference numeral 9a, in response to a plurality of notifications being generated, the notification-related content 910 can be provided in plural. In this instance, as illustrated, at least a portion of the notification-related content 910 can be displayed in a second area. For example, as illustrated, content displayed at the top of the notification-related content 910 can include most recently generated content or most previously generated content.

In addition, the electronic apparatus can identify a selection input 920 for the notification-related content 910. In response to the selection input 920 being received, the electronic apparatus can change a display type of the notification-related content 910 as indicated by reference numeral 9b. According to the reference numeral 9b, the electronic apparatus can display items of notification-related content in parallel in response to the selection input 920. Here, the selection input 920 can include a tap input or a long-press input but is not limited thereto. The selection input 920 can be implemented as various types of inputs.

In addition, the electronic apparatus can identify a drag input 930 to the second area in which the items of notification-related content are displayed in parallel. The drag input 930 can be an input moving in a specific direction. The electronic apparatus can adjust displaying of the notification-related content based on the direction of the drag input 930. For example, when the drag input 930 is an input moving in an upward direction, the electronic apparatus can scroll up the notification-related content such that the notification-related content is moved and displayed.

Also, the electronic apparatus can identify a specific input. The specific input may include an input that triggers displaying an input user interface (UI) 950 as indicated by reference numeral 9c. For example, the specific input can include a long-press input to one of the items of notification-related content.

The electronic apparatus can display the input UI 950 in at least a portion of the second area in response to the specific input. In some cases, the electronic apparatus can display the input UI 950 and notification-related content 940 corresponding to the specific input in at least a portion of the second area. As illustrated in the drawing, the corresponding portion in which the input UI 950 is displayed in the second area can be distinguished from an area in which the notification-related content 940 is displayed but not be limited thereto.

Figure 10:
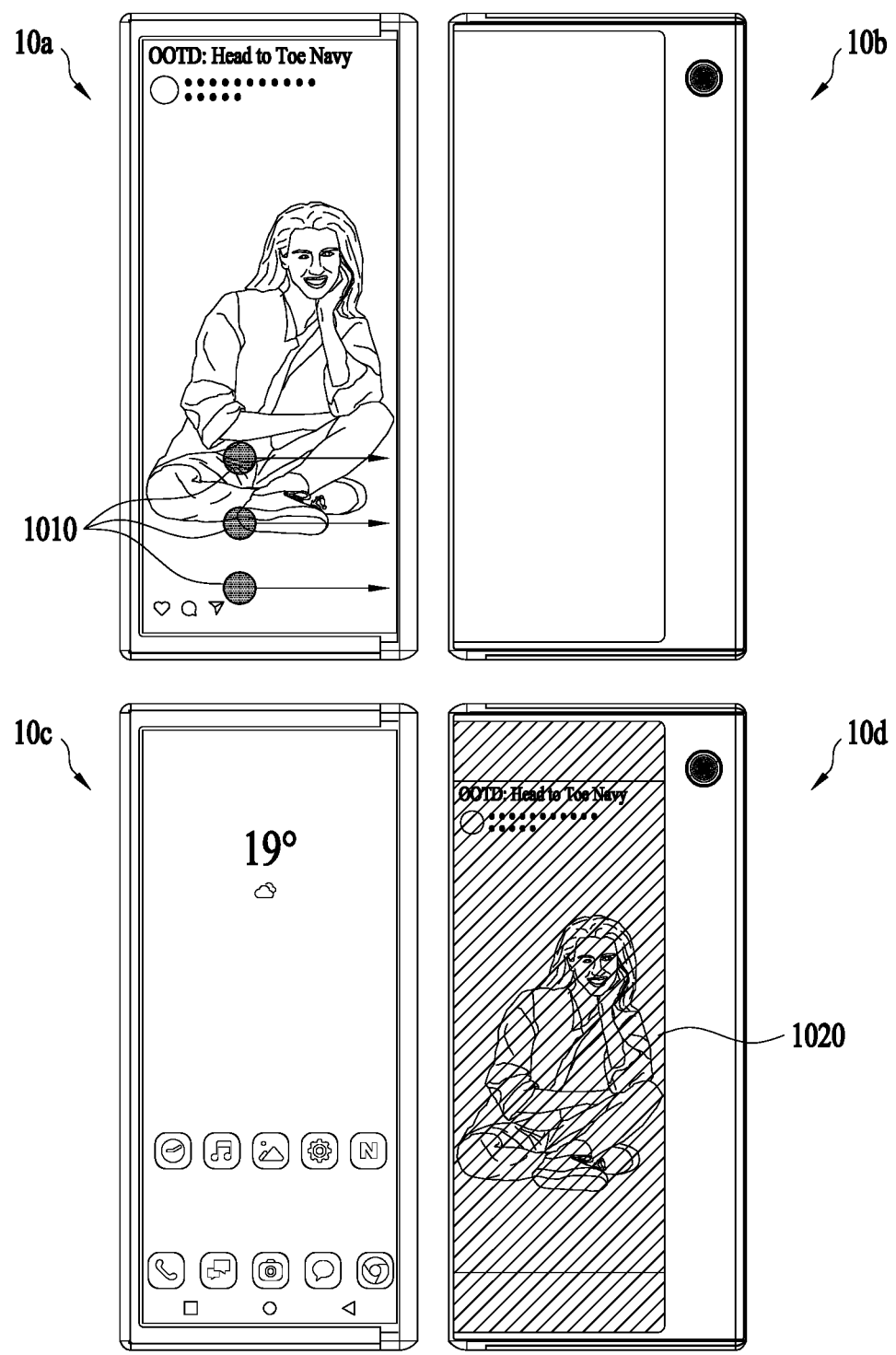
FIG. 10 illustrates an example of content displayed on a first surface or a second surface of an electronic apparatus according to an example embodiment of the present disclosure.

FIG. 10 illustrates an example of content displayed on a first surface or a second surface of an electronic apparatus according to an example embodiment of the present disclosure. Reference numeral 10a illustrates an example of a first area located at a first surface of an electronic apparatus to display application-related content. As indicated by the reference numeral 10a, content that provides visual information such as an image or a video can be displayed in the first area.

In the example embodiment, the electronic apparatus can identify an input 1010 to the first area. As illustrated, the input 1010 can include an input to a plurality of points in the first area, for example, a touch input of dragging each of the points in a predetermined direction. However, this is merely an example, and the input 1010 can be implemented as various types of inputs.

In the example embodiment, in response to a screen of the reference numeral 10a being displayed on the first surface, a screen of reference numeral 10b can be displayed on a second surface. The reference numeral 10b can correspond to an empty screen in which displaying of content is omitted or absent.

In the example embodiment, in response to the input 1010, the electronic apparatus can suspend displaying the application-related content in the first area and display the application-related content in the second area. For example, as indicated by reference numeral 10c, the electronic apparatus can suspend displaying the application-related content in the first area such that a home screen is presented. As indicated by reference numeral 10d, the electronic apparatus can display application-related content 1020 in at least a portion of the second area.

In some cases, a display brightness of the application-related content 1020 can be different from a display brightness of a case of the reference numeral 10a. For example, when a user is gazing at the first surface of the electronic apparatus, that is, when a pose of the user is a pose at which the user is gazing at a screen of the reference numeral 10c, the second surface corresponding to the reference numeral 10d can face the first surface.

In this example, the electronic apparatus can control a brightness of the first surface to be a first brightness and control a brightness of the second surface to be a second brightness. Here, the first brightness can be a brightness corresponding to the reference numeral 10a and higher than the brightness of the second surface. Further, when a pose of the user is a pose at which the user is gazing at the second surface of the electronic apparatus, the electronic apparatus can control the brightness of the second surface to be the first brightness and control the brightness of the first surface to be the second brightness. As such, the electronic apparatus can control the brightness of the first surface and the second surface of the display based on a state in which the user uses the electronic apparatus, thereby improving a usability of the electronic apparatus.

In addition, the aforementioned pose of the electronic apparatus can be identified by a pose recognition sensor included in the electronic apparatus as would be apparent to those skilled in the art and thus, repeated description will be omitted. When the displaying of the application-related content is suspended, another application-related content can be displayed in the first area. Specifically, when the application-related content is displayed in the second area based on the input 1010 as indicated by the reference numeral 10d, another application-related content can be displayed in the first area in response to an input for executing another application. Related description will be made with reference to FIG. 11.

Figure 11:
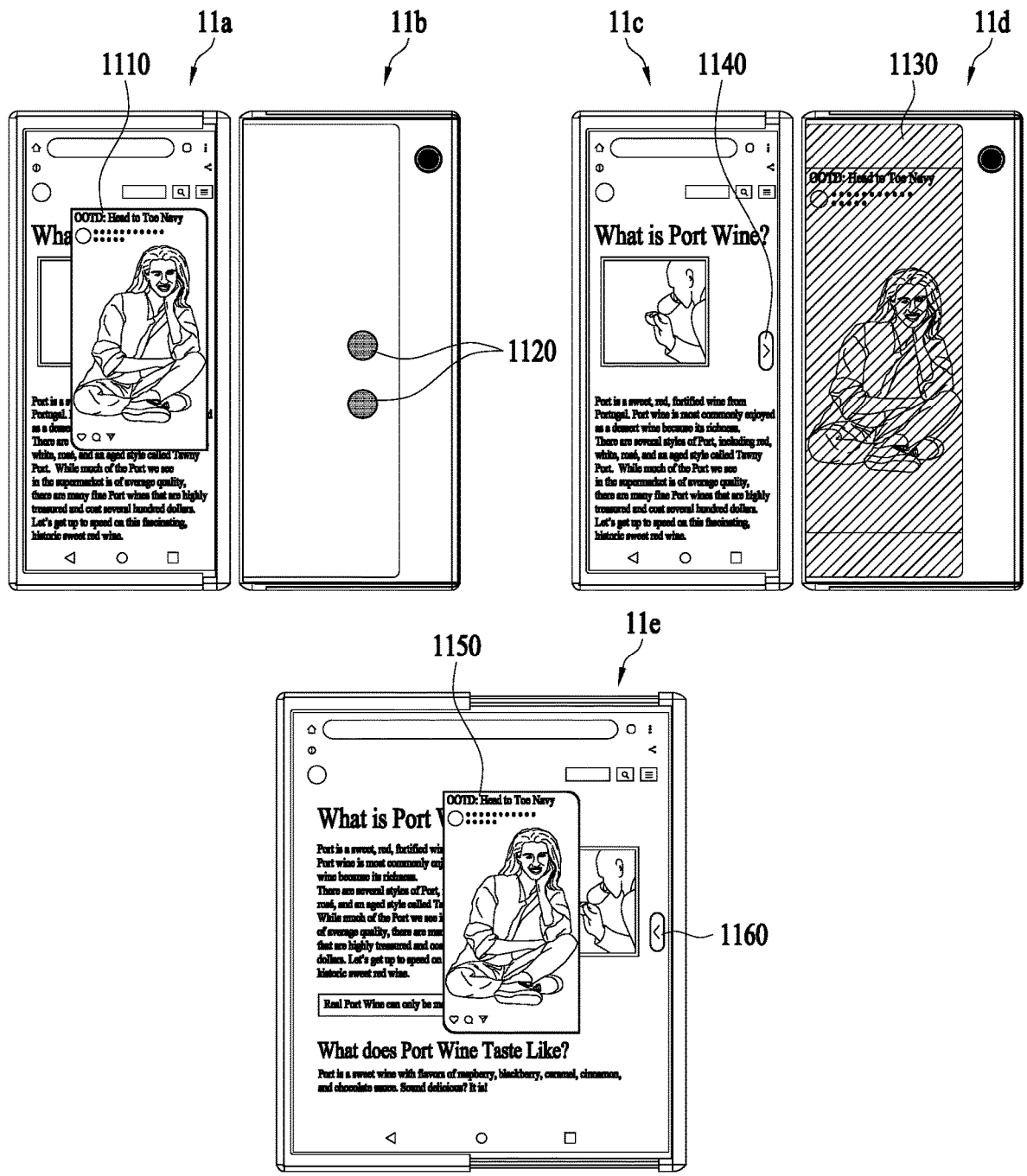
FIG. 11 illustrates an example of content displayed on a first surface or a second surface of an electronic apparatus according to an example embodiment of the present disclosure.

In particular, FIG. 11 illustrates an example of content displayed on a first surface or a second surface of an electronic apparatus according to an example embodiment of the present disclosure. Reference numeral 11a represents when application-related content 1110 is displayed in a first area to overlap another application-related content while the other application-related content is displayed in the first area. Specifically, when an input 1120 to a second area is received as indicated by reference numeral 11b, an electronic apparatus can display the application-related content 1110 in the first area as indicated by the reference numeral 11a.

Although the reference numeral 11b represents an example of identifying the input 1120 to the second area when the second area is empty, embodiments are not limited thereto. The input 1120 can also be identified in a state in which the application-related content is displayed in the second area as indicated by the reference numeral 10d of FIG. 10. In this instance, the electronic apparatus can display the application-related content 1110 in the first area as indicated by the reference numeral 11a.

Also, in response to the application-related content 1110 being displayed in the first area, the electronic apparatus can suspend displaying the application-related content 1110 in the second area but not limited thereto. In some cases, irrespective of whether the application-related content 1110 is displayed in the first area, the electronic apparatus can display the application-related content 1110 in the second area.

As represented by the reference numeral 11a, the application-related content 1110 can be displayed in the first area in a form of picture-in-picture (PIP). The PIP is to display one more small screen in one screen as would be apparent to those skilled in the art, and repeated description will be omitted.

In addition, the application-related content 1110 can be displayed in parallel to another application-related content displayed in the first area. For example, the application-related content 1110 and another application-related content can be displayed side by side in the first area. FIG. 11 illustrates the application-related content 1110 is displayed in the form of PIP as an example. However, embodiments are not limited thereto. The application-related content 1110 can also be arranged in parallel.

In one embodiment, the input 1120 of the reference numeral 11b can be maintained for a predetermined time. In this instance, the application-related content 1110 of the reference numeral 11a can be continually displayed based on the predetermined time in which the input 1120 is maintained.

In response to a release of the input 1120, a screen of reference numeral 11c can be displayed on the first surface and a screen of reference numeral 11d can be displayed on the second surface. The reference numeral 11c represents an example of a screen corresponding to the first area in which displaying of the application-related content 1110 is suspended and another application-related content is displayed. The reference numeral 11d represents an example of displaying application-related content 1130 in the second area.

In some cases, an icon 1140 related to a display expansion can be displayed in the first area as indicated by the reference numeral 11c. In such cases, at least a portion of the second surface can be located at the first surface in response to an input to the icon 1140. Through this, a screen of reference numeral 11e can be displayed.

In response to the display expansion, a size of the first surface can increase as indicated by the reference numeral 11e, so that application-related content 1150 is displayed in at least a portion of the first area and the second area located at the first surface. In one example, the application-related content 1150 can be displayed in an area increased in response to the display expansion. In another example, as indicated by the reference numeral 11e, the application-related content 1150 can be displayed in an area including at least a portion of each of the first area and the second area.

In some cases, an icon 1160 related to a display size control can be displayed together on the first surface. Also, a size of a display exposed on the first surface can be changed based on an input to the icon 1160. For example, in response to the input to the icon 1160, the size of the display exposed on the first surface can be reduced.

Further, a pose of a user gazing at the first surface of the electronic apparatus is assumed in the example of FIG. 11. In this instance, the first surface corresponding to the reference numeral 11a and the reference numeral 11c can have a first display brightness and the second surface corresponding to the reference numeral 11b and the reference numeral 11d can have a second display brightness. Here, the first display brightness can be higher than the second display brightness.

Figure 12:
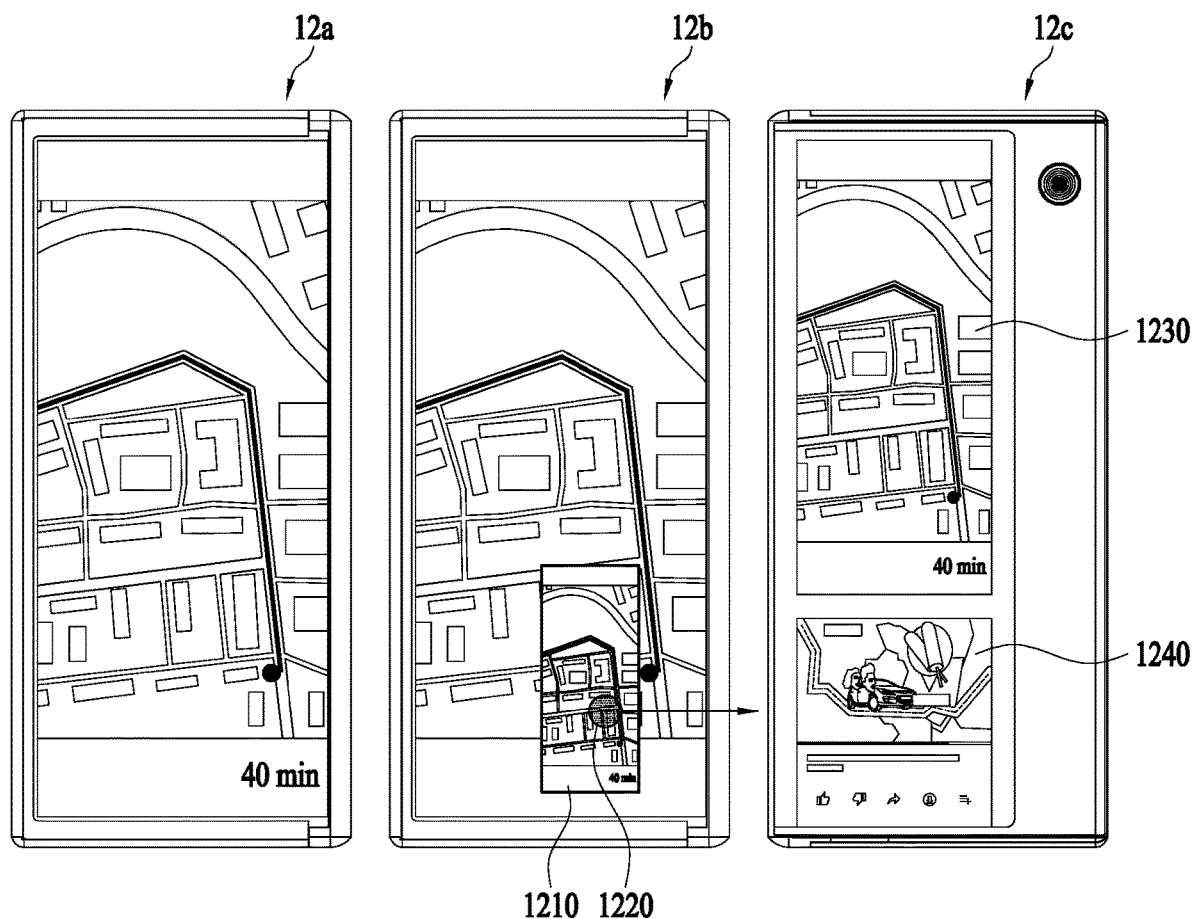
FIG. 12 illustrates an example of content displayed on a first surface or a second surface based on an operation of an electronic apparatus according to an example embodiment of the present disclosure.

Next, FIG. 12 illustrates an example of content displayed on a first surface or a second surface based on an operation of an electronic apparatus according to an example embodiment of the present disclosure. Reference numeral 12a represents an example of a first area in which content related to an application is displayed. Here, the application can be a map application but is not limited thereto.

When a screen of the reference numeral 12a is presented, an input for inducing a capture (hereinafter, referred to as "capture input") can be applied by a user. In response to the capture input being identified, the electronic apparatus can capture at least a portion of the first area as indicated by reference numeral 12b.

As represented by the reference numeral 12b, content 1210 related to a preview of a captured image generated through the capturing can be displayed on the first surface.

The electronic apparatus can identify an input 1220 to the content 1210. The input 1220 can be a predetermined input and can include an input that triggers displaying the captured image in at least a portion of a second area of a second surface of the electronic apparatus.

In response to the input 1220, the electronic apparatus can display a screen of reference numeral 12c in the second area. In some cases, another captured image, for example, a captured image 1240 generated before the captured image related to the reference numerals 12a and 12b is generated can be present. In such cases, the electronic apparatus can display a most recently generated captured image 1230 and the captured image 1240 generated before in the second area as indicated by the reference numeral 12c.

Figure 13:
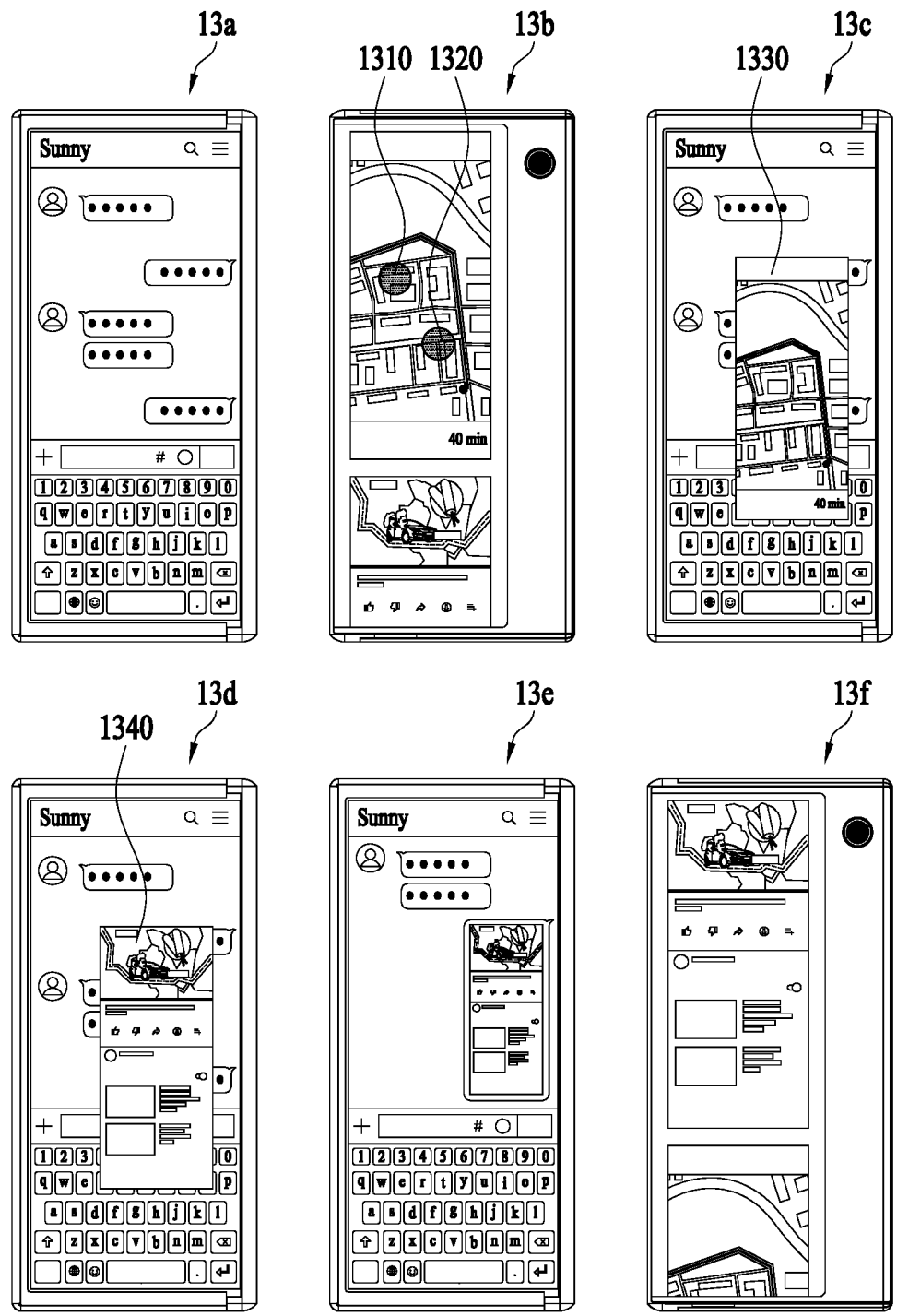
FIG. 13 illustrates an example of content displayed on a first surface or a second surface based on an operation of an electronic apparatus according to an example embodiment of the present disclosure.

Next, FIG. 13 illustrates an example of content displayed on a first surface or a second surface based on an operation of an electronic apparatus according to an example embodiment of the present disclosure. Reference numeral 13a represents an example of a first area in which application-related content is displayed in response to a messenger application being executed. The first area can correspond to an area of a display located at the first surface.

Reference numeral 13b represents a captured image is displayed in a second area, that is, an area of a display located at the second surface. In this instance, an input can be applied to the second area by a user. The input can include touch inputs to a first point 1310 and a second point 1320.

The electronic apparatus can display a portion 1330 (hereinafter, also referred to as "first captured image") of the captured image in at least a portion of the first area in response to the touch inputs to the first point 1310 and the second point 1320 as indicated by reference numeral 13c. Here, the first captured image 1330 can include, for example, a most recently generated captured image but not limited thereto. The first captured image 1330 can also include a most previously generated captured image or a captured image selected by a user.

In addition, the first captured image 1330 can be displayed for a period of time in which the touch inputs to the first point 1310 and the second point 1320 maintained. When the touch inputs to the first point 1310 and the second point 1320 are suspended, the displaying of the first captured image 1330 can also be suspended.

Also, the electronic apparatus can identify an input for changing the captured image displayed in the first area (hereinafter, also referred to as "change input"). The change input can be a predetermined type of input. For example, the change input can include an input for moving or sliding an input corresponding to at least one of the first point 1310 and the second point 1320.

The electronic apparatus can display another portion 1340 (hereinafter, also referred to as "second captured image") of the captured image in the first area in response to the change input. The second captured image 1340 can include, for example, an image generated before the first captured image 1330 is generated or an image generated after the first captured image 1330 is generated.

When a third captured image is present, the electronic apparatus can display the third captured image in the first area in response to the change input being received again. That is, based on the repetition of the change input, the captured image displayed in the first area can be changed repetitively.

The electronic apparatus can apply the captured image to an application based on an identification of an input for using the captured image as indicated by reference numeral 13e. Specifically, the electronic apparatus can identify a predetermined input to apply the captured image to the application and apply the captured image (e.g., input the captured image) to the application based on the identifying of the input as indicated by the reference numeral 13e.

When the second captured image 1340 is displayed in the first area in response to the change input for the captured image, an order of captured images displayed in the second area can also be changed. Specifically, the order of the captured images can be changed such that the second captured image 1340 is located above the first captured image 1330 as indicated by reference numeral 13f.

Figure 14:
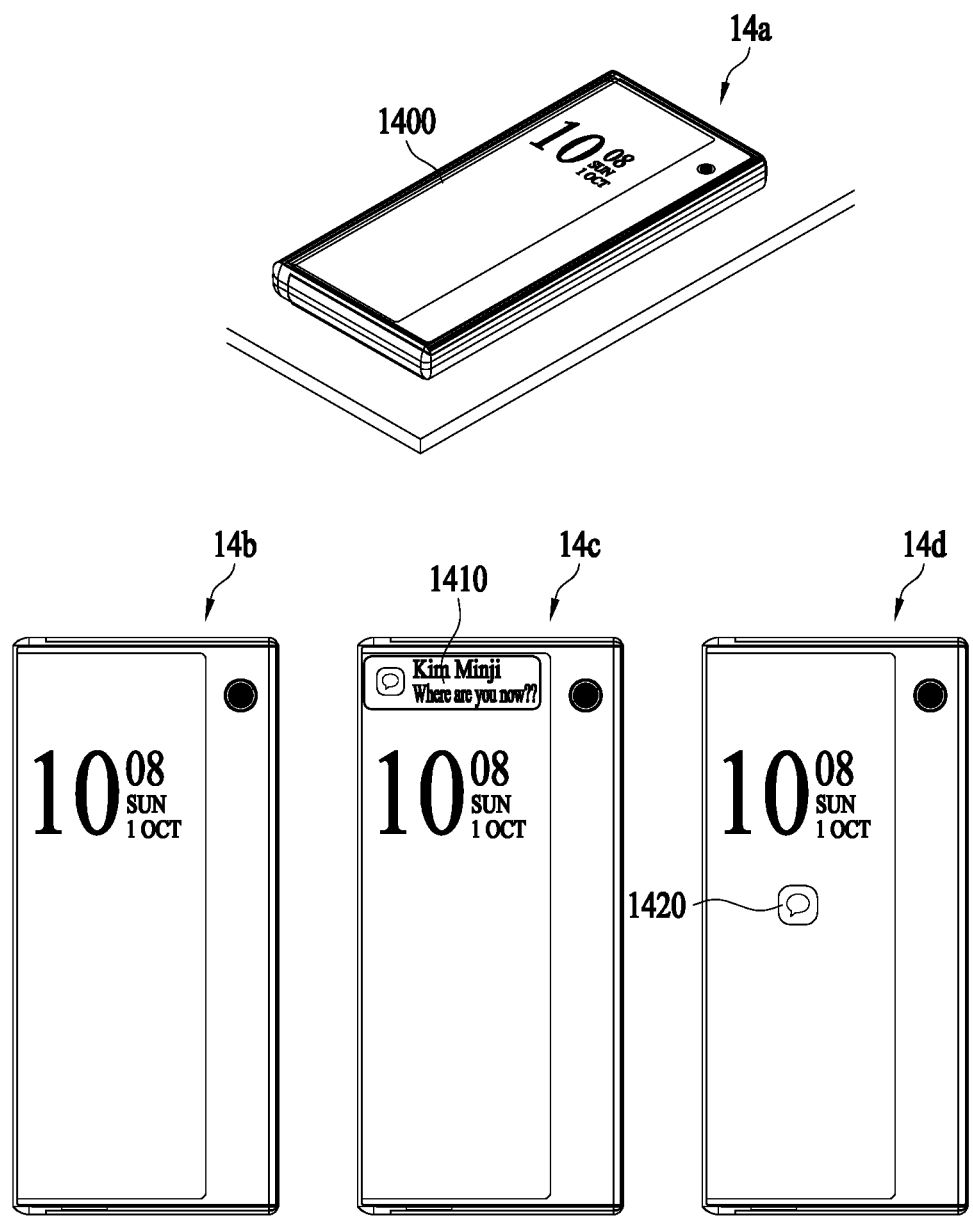
FIG. 14 illustrates an example of content displayed on a second surface of an electronic apparatus according to an example embodiment of the present disclosure.

Next, FIG. 14 illustrates an example of content displayed on a second surface of an electronic apparatus according to an example embodiment of the present disclosure. Reference numeral 14a represents a case in which a pose of an electronic apparatus is at a second pose. The second pose may be, for example, a pose at which a user is gazing at a second surface 1400, or at a pose at which a first surface is a bottom and the second surface 1400 is a top.

Reference numeral 14b represents an example of a screen displayed in a second area when the electronic apparatus is at the second pose. When the electronic apparatus is at the second pose, a display corresponding to the second area can enter an always-on-display (AOD) state. Accordingly, as illustrated, clock content can be displayed in at least a portion of the second area.

Reference numeral 14c represents an example of a screen displayed in the second area in response to a notification-related event. Specifically, when a notification-related event corresponding to a message reception occurs, the electronic apparatus can display notification-related content 1410 in at least a portion of the second area.

In addition, the notification-related content 1410 can be displayed for a predetermined time. After the predetermined time, the electronic apparatus can display a specific icon, for example, an icon 1420 as indicated by reference numeral 14d. The icon 1420 can include a predetermined icon representing that a history of displaying the notification-related content exists.

An electronic apparatus and a control method of the apparatus according to an example embodiment may distribute and display content on a first surface and a second surface of the electronic apparatus in response to a display being located at the first surface and the second surface, so that content is used with increased ease and convenience. In other words, in a case in which another content needs to be displayed while application-related content is displayed on the first surface, the electronic apparatus can display the content on the second surface or display the content on the first surface in response to an input to the second surface, so that the content is appropriately used without being interfered with by a use of the other content.

According to example embodiments, an electronic apparatus and a control method of the electronic apparatus can display content associated with a notification on a first surface or a second surface of the electronic apparatus in response to an event related to the notification, thereby providing the content associated with the notification with increased efficiency. Further, it is possible to display content associated with a notification based on an input to an electronic apparatus so that the content associated with the notification is provided appropriately for use of the electronic apparatus.

Effects are not limited to the aforementioned effects, and other effects not mentioned will be clearly understood by those skilled in the art from the description of the claims. The above description is merely illustrative of the technical idea of the present disclosure, and those skilled in the art to which the present disclosure pertains can make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. An electronic apparatus comprising:
a case including a first frame and a second frame configured to slide and extend with respect to the first frame;
a flexible display wound over a front surface and a rear surface of the case, wherein a first area of the flexible display on the front surface is increased or decreased in size based on a sliding movement of the second frame with respect to the first frame; and
a controller configured to:
display content associated with an application in the first area,
in response to an event, display notification information associated with the event in the first area, and
in response to a first input to a second area of the flexible display on the rear surface of the case, display at least a portion of content associated with the event in the first area.

2. The electronic apparatus of claim 1, wherein the controller is configured to display the at least the portion of the content associated with the event in the first area while the first input is maintained.

3. The electronic apparatus of claim 1, wherein the controller is configured to display the at least the portion of the content associated with the event in the first area in response to a proximity sensor input.

4. The electronic apparatus of claim 1, wherein the controller is configured to activate detection for the first input on the second area based on the event.

5. The electronic apparatus of claim 1, wherein the controller is configured to:
display the at least the portion of the content associated with the event in the second area, and
control a screen brightness corresponding to the first area or the second area based on an orientation of the electronic apparatus.

6. The electronic apparatus of claim 1, wherein the controller is configured to display at least a portion of the content associated with the application in the second area in response to a second input to the first area.

7. The electronic apparatus of claim 6, wherein when the at least the portion of the content associated with the application is displayed in the second area and a third input to the second area is identified, the controller is configured to display the at least the portion of the content associated with the application in the first area in response to the third input.

8. The electronic apparatus of claim 7, wherein at least a portion of the second area of the flexible display is slidably moved to the front surface in response to a sliding movement of the second frame with respect to the first frame, and
wherein the controller is further configured to display the at least the portion of the content associated with the application in the at least the portion of the second area slidably moved to the front surface.

9. The electronic apparatus of claim 1, wherein the controller is configured to:
generate one or more images of the content displayed in the first area in response to a second input to the second area, and
display at least a portion of the generated one or more images in the first area in response to a third input to the second area.

10. The electronic apparatus of claim 9, wherein the third input includes a first touch input and a second touch input on the second area, and
wherein the controller is configured to display at least a portion of an image among the one or more images in the first area in response to a position change of the first touch input.

11. The electronic apparatus of claim 1, wherein the information associated with the event includes an image of a color corresponding to the event, and
wherein the content associated with the event includes at least one of a text or an image related to the event.

12. A method of controlling an electronic apparatus having a case including a first frame and a second frame configured to slide and extend with respect to the first frame, and a flexible display wound over a front surface and a rear surface of the case, wherein a first area of the flexible display on the front surface is increased or decreased in size based on a sliding movement of the second frame with respect to the first frame, the method comprising:
displaying content associated with an application in the first area;
in response to an event, display notification information associated with the event in the first area; and
in response to a first input to a second area of the flexible display on the rear surface of the case, displaying at least a portion of content associated with the event in the first area.

13. The method of claim 12, further comprising:
displaying the at least the portion of the content associated with the event in the first area while the first input is maintained.

14. The method of claim 12, further comprising:
displaying the at least the portion of the content associated with the event in the first area in response to a proximity sensor input.

15. The method of claim 12, further comprising:
selectively activating detection for the first input on the second area based on the event.

16. The method of claim 12, further comprising:
displaying the at least the portion of the content associated with the event in the second area; and
controlling a screen brightness corresponding to the first area or the second area based on an orientation of the electronic apparatus.

17. The method of claim 12, further comprising:
displaying at least a portion of the content associated with the application in the second area in response to a second input to the first area.

18. The method of claim 17, wherein when the at least the portion of the content associated with the application is displayed in the second area and a third input to the second area is identified, the method further comprises displaying the at least the portion of the content associated with the application in the first area in response to the third input.

19. The method of claim 18, wherein at least a portion of the second area of the flexible display is slidably moved to the front surface in response to a sliding movement of the second frame with respect to the first frame, and
wherein the method further comprises displaying the at least the portion of the content associated with the application in the at least the portion of the second area slidably moved to the front surface.

20. The method of claim 12, further comprising:
generating one or more images of the content displayed in the first area in response to a second input to the second area; and
displaying at least a portion of the generated one or more images in the first area in response to a third input to the second area.

* * * * *